United States Patent
Karr

(10) Patent No.: US 8,441,391 B2
(45) Date of Patent: May 14, 2013

(54) ULTRA-SECURE COMMUNICATION METHODS AND APPARATUS

(75) Inventor: Lawrence J. Karr, Santa Monica, CA (US)

(73) Assignee: RoundTrip LLC, Sylmar, CA (US)

( * ) Notice: Subject to any disclaimer, the term of this patent is extended or adjusted under 35 U.S.C. 154(b) by 0 days.

(21) Appl. No.: 12/774,256

(22) Filed: May 5, 2010

(65) Prior Publication Data

US 2011/0273334 A1    Nov. 10, 2011

(51) Int. Cl.
*G01S 13/78* (2006.01)

(52) U.S. Cl.
USPC ................... 342/42; 342/45; 342/51

(58) Field of Classification Search ...................... 342/42
See application file for complete search history.

(56) References Cited

U.S. PATENT DOCUMENTS

| | | | |
|---|---|---|---|
| 4,628,319 A * | 12/1986 | Morwing et al. | 342/46 |
| 5,418,537 A | 5/1995 | Bird | |
| 5,576,716 A | 11/1996 | Sadler | |
| 7,646,330 B2 | 1/2010 | Karr | |
| 2007/0075834 A1* | 4/2007 | Armstrong et al. | 340/10.1 |
| 2007/0194925 A1* | 8/2007 | Karr | 340/572.1 |

* cited by examiner

*Primary Examiner* — Timothy A Brainard
(74) *Attorney, Agent, or Firm* — Gifford, Krass, Sprinkle, Anderson & Citkowski, P.C.

(57) ABSTRACT

A secure communication topology can be used for communications between a locator and one or more transponders to determine the location of the transponders. An example system may include a locator that is configured to transmit an interrogation signal that is encoded for receipt by one or more of the transponders. When a transponder receives and correlates the interrogation signal with an internally stored reference sequence, the transponder can transmit one or more reply transmissions at precisely determined time delay intervals. The time delay intervals are secretly known by both the locator and the transponder. The reply transmissions can each correspond to previously sampled noise signals that are also secretly known by both the transponder and the locator.

5 Claims, 20 Drawing Sheets

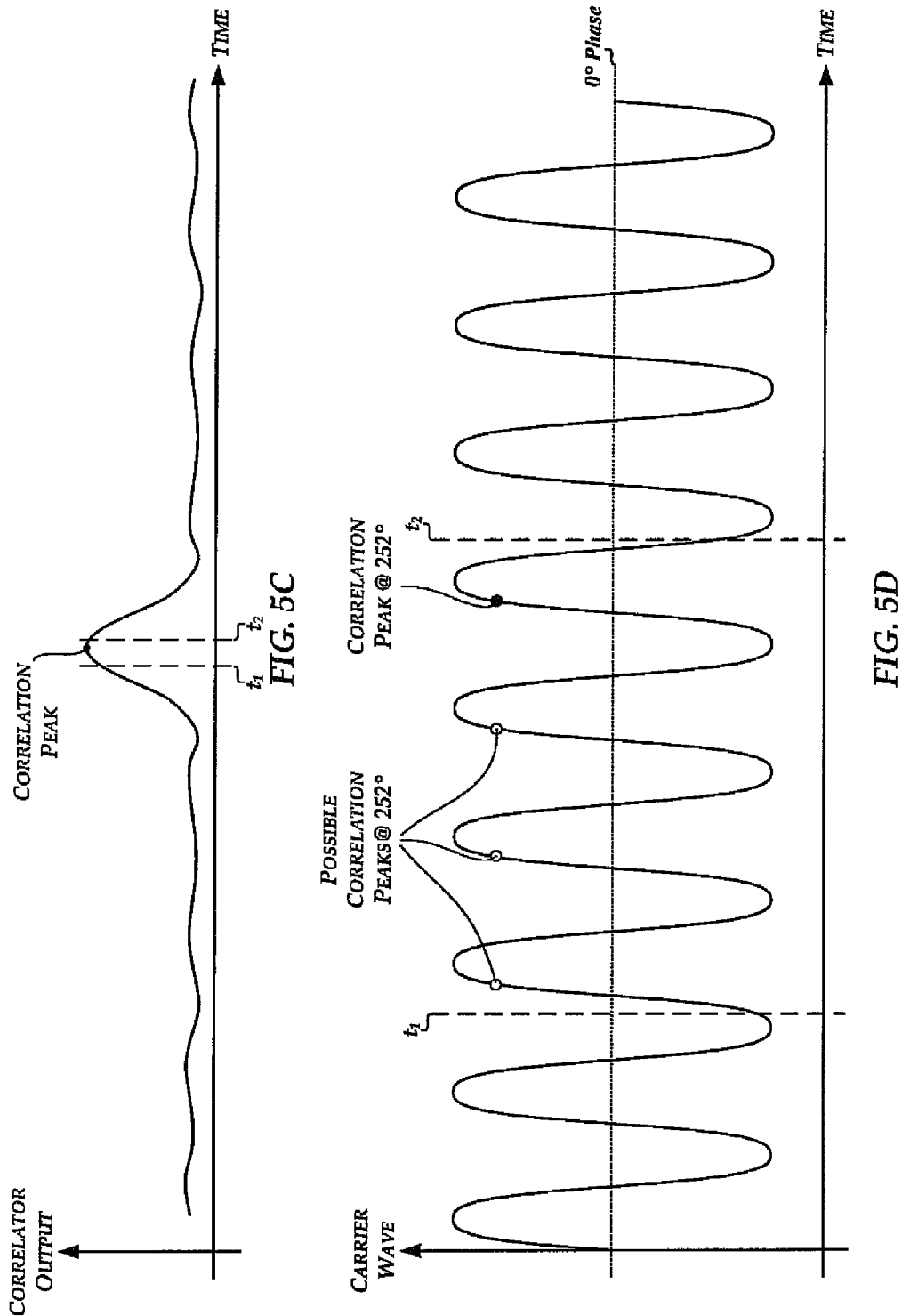

ULTRA-SECURE COMMUNICATION METHODS AND APPARATUS

FIELD OF THE INVENTION

This invention relates generally to secure communications and, in particular, to a topology enabling one or more locators to determine the location(s) of one or more transponders, and wherein time delay intervals and/or noise or noise-like signals are secretly known only to the transponder(s) and locator(s), resulting in an ultra-secure system.

BACKGROUND OF THE INVENTION

Some methods for locating an object are known in the art. A missing vehicle locator system is described in U.S. Pat. No. 5,418,537 issued to Bird. The vehicle locator system uses one or more GPS systems in conjunction with a GPS antenna, a receiver/transmitter, a telephone with associated antennas, and a modem mounted in a vehicle whose position is to be monitored. A paging request is issued and received by a paging responder in the vehicle. The paging request causes the modem to interrogate the GPS receiver to determine the current position of the vehicle. The current position of the vehicle is transmitted via a cellular telephone link to notify a vehicle location service center of the current location of the vehicle. Other known location determination techniques include the use of a Loran or a Glonass satellite based system.

Another object location system is described in U.S. Pat. No. 5,576,716 to Sadler for locating lost or stolen property. This location system includes a GPS module, a microcomputer, a modem, and a telephone, all of which must be installed in the vehicle. The system described regularly and automatically computes the position of the property for transmission via the phone link to a central receiver/transmission station.

Low power transmissions are subject to signal corruption due to noise, static, and signal interference. Extracting information from a signal in the presence of such interference and noise is very difficult when the information signal is of the same order of magnitude as the noise sources.

SUMMARY OF THE INVENTION

The present invention addresses various noise problems associated with secure or covert communications arrangements, and provides systems, methods, and apparatus capable of extracting intelligence from a transmission using very low power and a high degree of miniaturization to locate persons, objects and other tracked targets.

A secure communication topology according to the invention can be used for communications between one or more locators and one or more transponders to determine the location(s) of the transponders. An example system may include a locator that is configured to transmit an interrogation signal that is encoded for receipt by one or more of the transponders. When a transponder receives and correlates the interrogation signal with an internally stored reference sequence, the transponder can transmit one or more reply transmissions at precisely determined time delay intervals. The time delay intervals are secretly known by both the locator and the transponder. The reply transmissions can each correspond to previously stored or presently generated noise or noise-like signals, also secretly known by the transponder and the locator.

A method for locating a transponder (MT) with a remote locator (RL) includes the steps of transmitting, by the RL, an interrogation signal that is encoded with a specific ID Code associated with the MT. The interrogation signal is received with the MT, which adjusts transmission characteristics of a transmitter in the MT for subsequent transmission back to the RL. The MT and the RL are operated independently from one another, with common knowledge of a previously determined timing delay (Delay D1) and a previously determined noise pattern (Noise N1).

When the interrogation signal is determined to be encoded with the specific ID code by the MT, the MT encodes the previously determined noise pattern (Noise N1) in a first portion of a reply signal transmission. The MT waits for the expiration of the previously determined timing delay (Delay D1) before transmitting the first portion of a reply signal transmission to the RL.

The RL determines an adjusted timing delay (Delay DA1) from the previously determined timing delay (Delay D1) associated with the first portion of the reply signal transmission. After transmitting the interrogation signal, the RL waits for the expiration of an adjusted timing delay (Delay DA1) before capturing the first portion of the reply signal transmission.

The first portion of the reply signal transmission is correlated with the previously determined noise pattern (Noise N1) to determine a distance between the RL and the MT and a rough Doppler shift measurement associated with the correlation.

The step of adjusting the transmission characteristics of the transmitter in the MT may include adjusting the timing, phase, cadence, and/or frequency associated with the transmission by the transmitter in the MT.

The method may further include the steps of encoding, by the MT, an additional previously determined noise pattern in a different portion of the reply transmission signal, and awaiting, by the MT, the expiration of the additional previously determined timing delay before transmitting the different portion of the reply signal transmission from the MT to the RL.

The method may additionally comprise the step of determining, by the MT, a power level associated with the interrogation signal and wherein adjusting the transmission characteristics comprises adjusting a transmit power level associated with the transmitter in the MT in response to the determined power level associated with the interrogation signal. The transmit power level may be inversely related to the determined power level associated with the interrogation signal.

Various other method aspects of the invention are additionally described in detail, as are system and apparatus components and subsystems, including exemplary remote locator and transponder implementations; transmitters and receiver configurations and sequences; noise sample pattern generators; correlators and correlation processes; data encoding schemes; timing acquisition sequences; and operational flow, features and observations.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified:

FIGS. 5C-5D are diagrams illustrating example correlation peaks for an example receiver;

DETAILED DESCRIPTION OF THE INVENTION

Figure 1A:
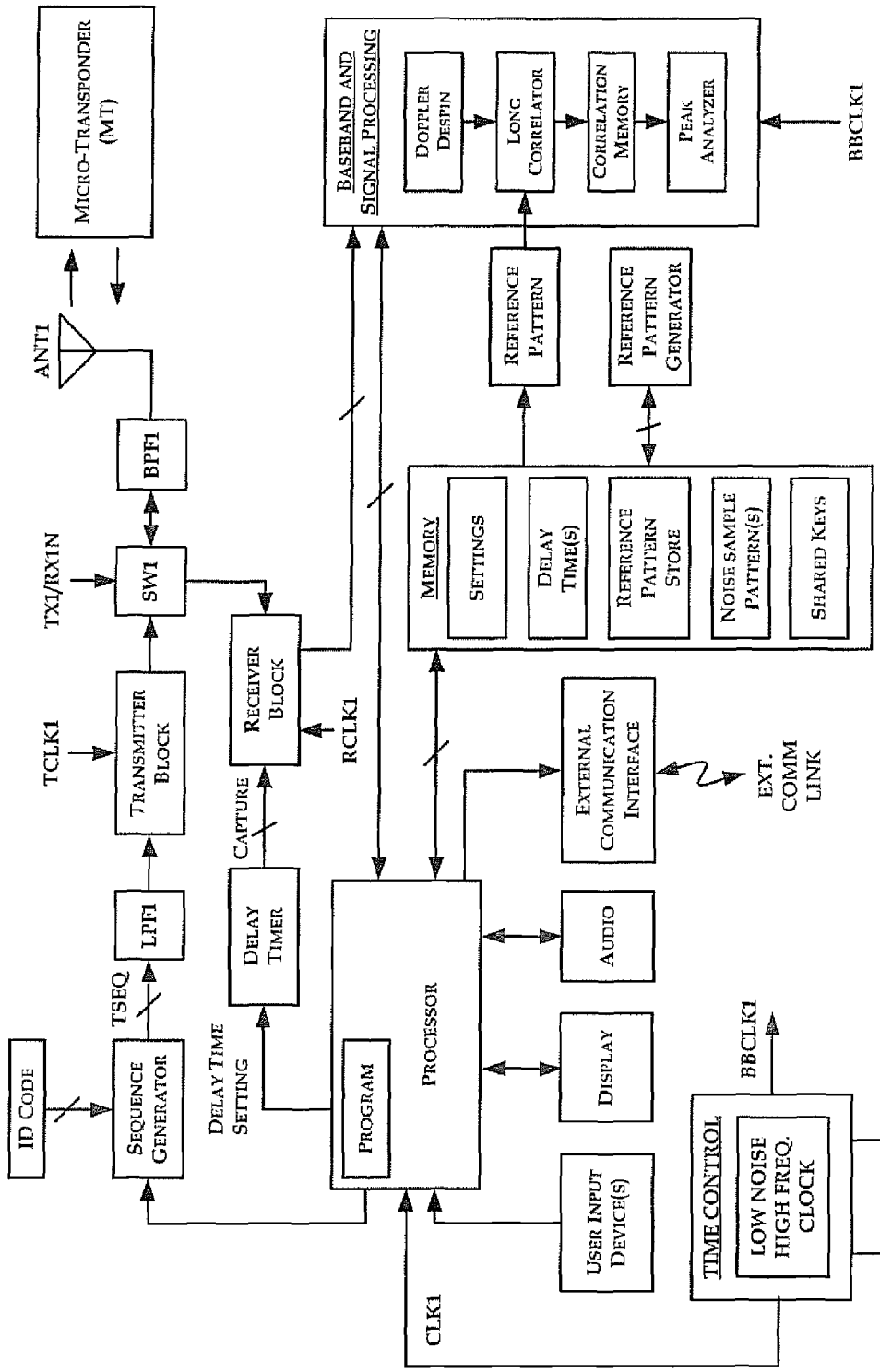
FIGS. 1A and 1B illustrate a secure communication system constructed in accordance with this invention that includes a remote locator (RL) and a micro-transponder (MT)

The invention now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Throughout the specification, and in the claims, the term "connected" may mean a direct electrical connection between the things that are connected, without any intermediary devices. The term "coupled" may mean either a direct electrical connection between the things that are connected or an indirect connection through one or more passive or active intermediary devices. The term "circuit" may mean one or more passive and/or active components that are arranged to cooperate with one another to provide a desired function. The term "signal" may mean at least one current signal, voltage signal, electromagnetic wave signal, or data signal. The meaning of "a", "an", and "the" may include plural references. The meaning of "in" may include "in" and "on".

Briefly stated, the present invention relates generally to a secure communication system, method and apparatus. The communication topology generally described herein can be used for secure communications between one or more locators and one or more transponders to determine the location of the transponders. An example system may include a locator that is configured to transmit an interrogation signal that is encoded for receipt by one or more of the transponders. When a transponder receives and correlates the interrogation signal with an internally stored reference sequence (or reference pattern), the transponder can transmit one or more reply transmissions at precisely determined time delay intervals. The time delay intervals are secretly known by both the locator and the transponder. The reply transmissions can each correspond to previously sampled or presently generated noise signals secretly known by both the transponder and the locator.

The locator may also be referred to herein as a remote locator. The term "remote" is intended to imply that the locator device is separated from the transponder by some unknown distance, but is not intended to be limiting. In some examples, the locator device can correspond to a portable device such as a small form factor handheld device. In some other examples, the locator may correspond to a stationary device such as a base station. These examples are not intended to be limiting and any appropriate device that is configured to operate in accordance with the present disclosure is contemplated. For simplicity the terms "locator", "remote locator", and "base station" will be referred to hereinafter as simply a remote locator or "RL."

The transponder can also be referred to herein as a micro-transponder. The term "micro" is intended to imply that the transponder can be a small form factor device. In some examples, the transponder device can correspond to a portion of another system such as an electronic system in a vehicle or some other electronic device such as a radio handset. In some other examples, the transponder device can be embedded in an object as a standalone device. Example objects where the transponder might be embedded include, but are not limited to, a fabric such as an article of clothing, a dog-tag, a wristband or a collar that may be worn or affixed to a subject. In still other examples, the transponder device may be implanted into a subject. These examples are not intended to be limiting and any appropriate device that is configured to operate in accordance with the present disclosure is contemplated. For simplicity the terms "transponder", "micro-transponder", and "tag" will be referred to hereinafter as simply a micro-transponder or "MT."

As will be described, the RL and the MT each include a receiver and a transmitter. The communication signals from the transmitters are encoded with a unique ID code. In some examples, a group ID code can be used so that a locator (RL) can address multiple MTs at the same time such as might be desirable for broadcast messaging. The communication signals transmitted by the RL consist of a sequence of encoded transmissions that can be referred to as an interrogation signal. The receiver in each MT is configured to capture the interrogation signal, validate the ID code by correlation, and decode any information from the interrogation signal. The frequency, phase, and starting time of the coded transmission sequence can be determined by the transmission sequence itself such that clock recovery can be performed without additional information.

Frequency and phase information in the MT can initially be recovered from one portion of the transmission (e.g., the interrogation signal) from the RL, and further refined using a bootstrapping process. Timing location within the frame (e.g., coarse timing) can be recovered in another portion of the transmission from the RL. After the timing, phase and frequency are recovered, data reception can be scheduled with a degree of certainty. The data can be extracted and a reply message (or reply transmission), which can correspond to a secure communication that corresponds to noise signals, can be transmitted from the MT back to the RL, where similar signal processing functions are performed. The carefully corrected round-trip time and the recovered phase of the transmission sequence is used to identify distance between the RL and the MT. A synthetic round-trip Doppler shift, which is independent of the MT's internal clock, is measured to and correlated against the relative motion of the RL and MT to assess identify an appropriate direction for a directional vector between the RL and the MT. The magnitude of the directional vector is determined by the round-trip time.

The presently described system has the ability to identify location of a RL with a MT utilizing an asymmetric transmission system. The signals captured by the MT will typically not be aligned in time with the start and end of a complete pattern in the sequence (e.g., a 2047 chip sequence). However, the RL is arranged to transmit repeated patterns over time in the sequence for the interrogation signal. The MT can be arranged to capture a complete pattern in the sequence for the interrogation signal, even though the captured pattern may be rotated in time relative to the start and end of a complete pattern. A circular correlator can be used to evaluate the captured signals for the interrogation signal such that the captured signals are properly identified by the MT, despite the rotation status of the pattern. Since the MT does not have a priori knowledge of the timing related to transmission and reception from the RL, circular correlations of the received transmissions are used by the MT to determine the fine and coarse timing. A circular correlation is a correlator that operates on a sequence of fixed length, where the sequence may be circularly shifted in time such that the beginning of the original sequence may be received in the shifted sequence after the end of the original sequence. While a general correlator may not give valid timing information, the circular correlation will provide valid timing information when the captured signals are not aligned in time with the start and end of a complete pattern.

The presently described asymmetric transmission system can be configured such that the MT receives a relatively high power transmission of a structured signal from the RL, while the reply or acknowledgement transmission from the MT to the RL is a very low power transmission. An example MT is configured to operate in a very low power "inactive" mode or "sleep mode", where the MT "activates" or "wake-ups" for brief intervals to listen for the transmission from the RL. The MT correlates each piece of its received structured signals to determine if these signals are coded with an identification code (ID Code) that is specifically associated with the MT. The MT also determines the precise frequency, timing, phase, and cadence for which a reply transmission can be transmitted back to the RL from the received structured signals. The reply transmission that is transmitted from the MT to the RL is a very low power transmission of short duration (a short structured signal) such that significant battery life is conserved. Although the reply transmission is a very low power transmission, the RL is arranged to utilize an integration and circular correlation technique to increase the signal-to-noise level of the captured reply transmission.

In the presently described system, a reply transmission signal (e.g., a secure communication) is transmitted back to the RL from an MT, where the MT synthesizes timing, frequency, phase, and cadence for the reply transmission from signals that are received by the MT from the RL. The frequency of the reply transmission from the MT differs from the original frequency from the RL's transmission by a Doppler shift (ignoring other noise and minor error sources). As such, the RL can predict the reply transmission frequency with a very small margin of error. The potential uncertainty of the reply transmission frequency is small enough so that the phase rotation over a transmission sequence is only a few turns.

The MT replies with a transmitted phase which is either matched to the phase of the received locator signal (a zero degree phase difference), or additively related to the phase of the received locator signal. The RL is therefore able to precisely determine the round trip phase shift, and determine distance in terms of carrier cycles. For example, as illustrated in FIG. 5C a RL receives a reply transmission from an MT and identifies a correlation peak within a time interval of $t_1$ to $t_2$. The time interval ($t_1$ to $t_2$) exactly corresponds to one cycle of the carrier wave shown in FIG. 5D. For example, a 915 MHz carrier wave has a period of approximately 1.093 nano-seconds. The phase of the carrier wave at the time of a correlation peak in this example corresponds to about 70% of the time interval ($t_1$ to $t_2$) or about 252 degrees. This phase determination becomes useful when the signal-to-noise ratios at the MT and at the RL are sufficiently great to allow the selection of a particular carrier cycle. Since a carrier cycle at 915 MHz for instance is a distance of about 33 centimeters, the distance determination without carrier phase identification must be accurate to about 33 centimeters to allow selection of a particular carrier phase. For example, 100 cycles of a 915 MHz carrier wave corresponds to a distance of about 32.8 meters). Distance measurements can then be refined in accuracy to within a small fraction of a carrier cycle (a centimeter or two) using the phase information. For example, a phase of 252 degrees corresponds to a distance of about 23 centimeters for a carrier frequency of 915 MHz. Thus, the described system has two accuracy states, one for the number of cycles that occur before a correlation peak is found, and one for the precise phase of the carrier signal when the correlation peak is detected. For example, 100 cycles of a 915 MHz carrier wave with a detected phase of 252 degrees corresponds to about 33 meters of distance. When multiple independent distance estimates resulting from interrogations by several remote locator are consolidated together, the distance estimates can be improved often to the point where the phase navigating, interferometric based measurements becomes possible with exceptional accuracy.

To prevent unauthorized reception, the transmission signals from the MT to the RL can correspond to band limited filtered signals that are noise or noise-like in that they lack any recognizable pattern. The noise or noise-like signals are secretly known by both MT and the RL such that the RL can correlate the signals received from the MT using the same sampled noise signals. In some examples, the sampled noise signals can be derived from a shared secret key. In some other examples the sampled noise signals can be previously stored in a memory of the MT and/or the RL and retrieved when needed for transmission.

To prevent unwanted reception, the time of transmission from the MT to the RL can correspond to a delayed transmission time that is secretly known by the MT and the RL. In some examples, the delay time for each reply transmission can be derived from a shared secret key. In some other examples, the delay time for each reply transmission can be previously stored in a memory of the MT and/or the RL and retrieved when needed for determination of transmission time scheduling or reception time scheduling.

EXAMPLE SYSTEM

Figure 1B:
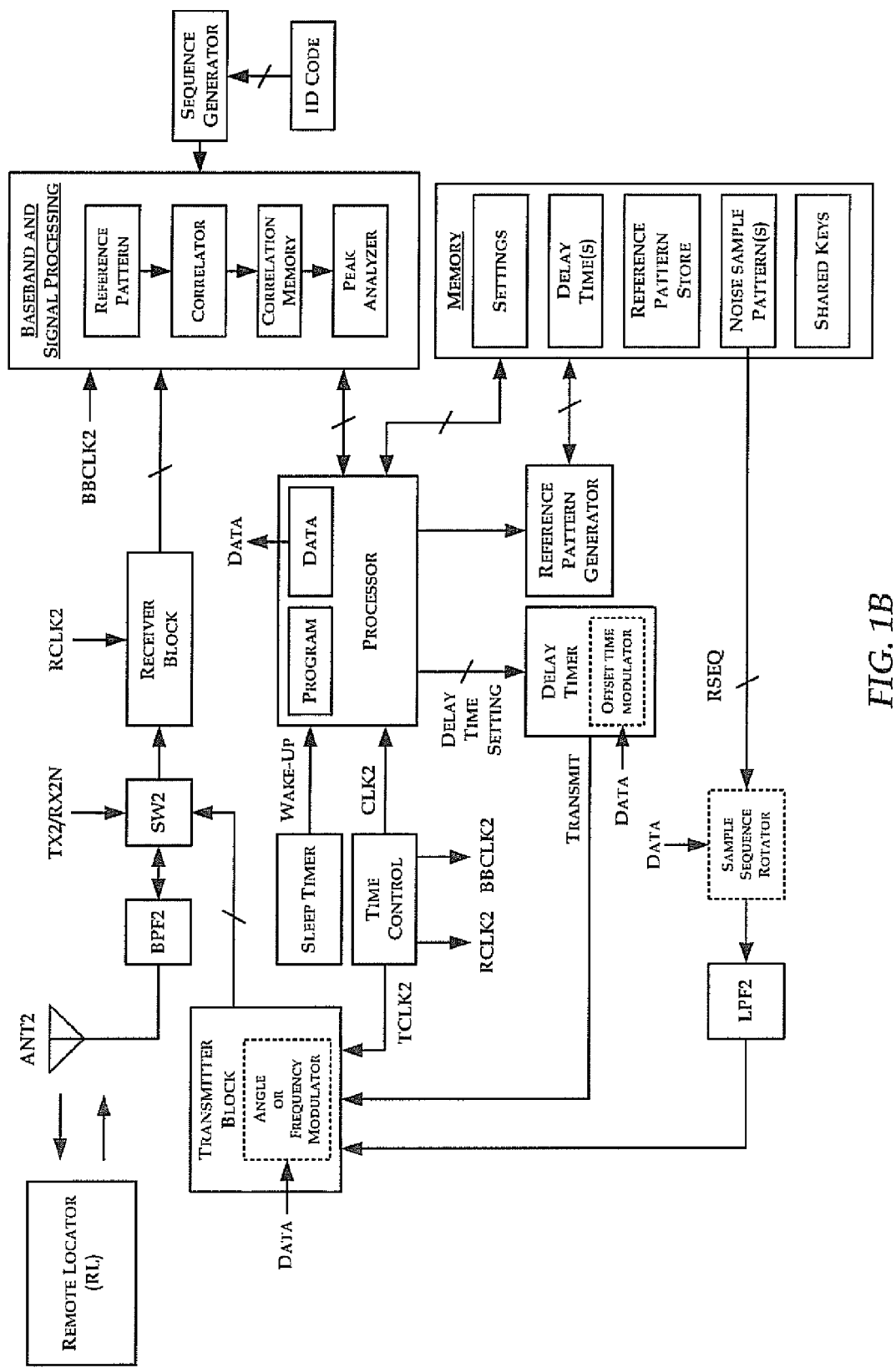

FIGS. 1A and 1B illustrate an example communication system that includes a RL and a MT arranged in according with at least some embodiments of the present disclosure. The RL is arranged to transmit a sequence over a first communication channel, while the MT is arranged to transmit back to the RL over the communication channel in a half-duplex fashion. An example communication system that can be further configured and adapted for operation in accordance with the present disclosure is described in U.S. Pat. No. 7,646,330, which is hereby incorporated by reference in its entirety.

The example RL device includes a first antenna (ANT1) that is coupled to a first transmit/receive switch (SW1) via an optional band pass filter (BPF1). Another antenna (ANT1B, not shown) can optionally be coupled to the receiver block in some example systems through an additional switch (SW1B, not shown), where the second antenna can be oriented orthogonal with respect to the first antenna. The selection of the antenna can be accomplished by a select control signal (SEL, not shown) that can be arranged to operate the additional switch (SW1B, not shown) as a multiplexer between the various antennas. The antennas can be configured as diversity antennas so that additional information about signal strength, distance and Doppler can be obtained. The first transmit/receive switch (SW1) can be coupled to a first transmitter block and a first receiver block in response to a first control signal (TX1/RX1N), which can be provided by a processor. A sequence generator is coupled to the processor and arranged to generate a transmission sequence (e.g., TSEQ) that can be coupled to the first transmitter block when transmission commences. The sequence can be determined by the sequence generator, at least in part, in response to an ED code. The first receiver block can also be coupled to the baseband and signal processing block. Time control can be provided to the transmitter, receiver, baseband processing, and the processor in the form of various control signals (CLK1, RCLK1, TCLK1 and BBCLK1). The receiver can be further configured to capture signals when a capture (CAPTURE) signal is asserted at an appropriate time that is identified with one or more of delay times as will be described later. The processor can be configured to receive inputs and coordinate the operations of the baseband processing, signal analysis, memory buffering, input processing, display processing, and/or audio processing, each of which may be facilitated by the operation of one or more programs with the processor. The memory processing can include random access memory (RAM), read-only memory (ROM), as well as non-volatile memory (NVM) such as Flash memory, battery backed up RAM, EEPROM, as well as other NVM type technologies. The memory in the RL may include stored therein, processing logic (e.g., programs), one or more system settings, one or more shared keys, one or more noise sample patterns, reference patterns, and/or one or more delay times that may be used for establishing various operations in the RL.

The example MT device includes a second antenna (ANT2) that can be coupled to a second transmit/receive switch (SW2) through an optional band-pass filter (BPF2). The second transmit/receive switch (SW2) can be coupled to a second transmitter block and a second receiver block in response to another control signal (TX2/RX2N). A reply sequence (e.g., RSEQ) can be coupled to the second transmitter block when transmission commences, where the reply sequence can be determined by one or more of the ID code, one or more shared keys, and/or one or more noise sample patterns as will be described later. The second receiver block can be arranged to provide in-phase and quadrature signals (I and Q) that are captured in a buffer (e.g. a memory buffer such as a digital buffer or an analog sample buffer). The capture buffer can be coupled to a correlator in a baseband signal processor block, which can provide both direct form correlation and FFT correlation functions. The correlator can be arranged to provide a circular correlation function of the received I/Q data with the complex I/Q data related to the ID code. A signal analyzer and a processor can both be arranged to receive the data output from the correlator for evaluation. Time control can be provided to the second transmitter block, second receiver block, and the processor in the form of various additional control signals (TCLK2, RCLK2 and CLK2). The processor receives inputs and coordinates the operation of the correlator, signal analysis, sequence generation, memory buffering, and other related tasks. The second transmitter block can be further configured to transmit signals when a transmit signal (TRANSMIT) is asserted at an appropriate time that is identified with one or more of delay times as will be described later. The memory for the processor can include random access memory (RAM), read-only memory (ROM), as well as non-volatile memory (NVM) such as Flash memory, battery backed up RAM, EEPROM, as well as other NVM type technologies. The memory in the MT may include stored therein, processing logic, one or more system settings, one or more shared keys, one or more noise sample patterns, and/or one or more delay times that may be used for establishing various operations in the MT.

Current technology systems for locating people and things have a rather short battery life, which can limit their use. In some examples, the present disclosure describes a small device (e.g., a transponder or a micro-transponder) that has a long battery life by suspending energy consumption until operation is required. Since the MT device can be in an active state for very brief intervals, the battery life can be extended substantially. Although cellular telephone technologies can be used to determine position in conjunction with a global positioning system (GPS) set, the energy required to operate conventional cellular telephones even in a standby mode may rapidly deplete small batteries. In addition, a GPS set in such an application would awaken from sleep, and perform a cold start location fix, which process may consume a considerable amount of energy that again rapidly depletes the battery. The present disclosure contemplates that a portable location technology may preferably be operated intermittently to minimize power consumption, and thus addresses some of the problems from conventional location determination techniques.

The present disclosure analyzes and identifies problems with current Doppler shift technology such as found in GPS signals. Although GPS signals may be detected efficiently by means of FFT correlation, there are approximately 28 GPS satellites that include a significant level of Doppler ambiguity from about ±15 ppm. For a GPS signal of 1.5 GHz and a capture interval of 1 msec, a Doppler shift of roughly 22 KHz maximum requires on the order of several tens of Doppler bins or correlation attempts to identify the Doppler shift. The processing efforts necessary to utilize a conventional GPS technology are unacceptable for the presently disclosed use. For example, the MT in the current disclosure is searching for a single code, and in addition, need not contend with huge velocities, and thus does not require any Doppler bins. Moreover, the present disclosure describes an apparatus and system that has reduced capture times relative to conventional technologies, where the magnitude of the processing is reduced by approximately two orders of magnitude.

EXAMPLE REMOTE LOCATOR (RL)

FIG. 1A illustrates an example RL that can be arranged to communicate with an example MT in accordance with various aspects of the present disclosure. The RL includes a processor that can be any appropriate processing means including but not limited to at least one: micro-processor, micro-controller, CISC processor, RISC processor, application specific integrated circuit (ASIC), to name a few. The processor can be arranged to: receive and evaluate inputs, control outputs, log data, retrieve logged data, and execute programs. The processor of the RL can thus arranged to communicate with any number of circuit components such as: a time control circuit, a delay timer circuit, a sequence generator circuit, a storage circuit (not shown), a baseband and signal processing circuit, a user input device, a display device, an audio device, an external communication interface, and/or a memory circuit.

The processor can be arranged to apply processing logic that is responsive to messages received from the MT, as well as its own internal mechanisms, for activating and deactivating a variety of operating modes as will be described. The processing logic and any related settings for the RL can be provided in a read-only memory (ROM) that can be loaded into a conventional memory for execution by the processor, or by some equivalent mechanism such as a non-volatile memory (NVM), a flash memory device, and hard-coded instructions in a micro-controller, to name a few. In another example, the processor and memory can be replaced with a programmable logic device (PLD), a specially designed circuit such as an application specific integrated circuit (ASIC), as well as others devices that are arranged to provide similar functionality.

Example inputs can be from any number of sources such as: an interrupt signal, a keyboard device, a keypad device, one or more buttons or keys, a touch-screen (passive or active), a touch-panel, a joystick device, a joy-pad device, a mouse device, a pointing device, a touch-pad device, a pressure sensitive input device, or another processor and an input generated by a software program. In some examples, sound can be used as an input to the RL via audio input processor such as an analog-to-digital converter (ADC) circuit or a coder-decoder (CODEC) circuit that includes analog-to-digital conversion means. A microphone can be built into the RL or externally coupled to the RL through a microphone port for sound input purposes, where signals received by the microphone into a digital signal that can be interpreted as an input. The sound-based input can be stored for further use (e.g., a sound file for playback or recognition purposes) or interpreted as a voice input that can be utilized by the RL. In some implementations, a voice-to-text interpreter can be incorporated into a hardware solution that is arranged in communication with the processor. In some other examples, voice recognition under software control implemented by the audio input processor to operate as a voice input means that generates an example input.

Audio output circuits can be used as an indication means for reporting audible information to a user of the RL device, as well as to provide navigation and location information. The audio output circuit can include an audio output device and an audio output processor. The audio output processor can be arranged to cooperate with the audio output device to provide an audible notification to the user. The functions of the audio output device and the audio output processor can be combined in some implementations. The audio output device can be an audio driver circuit for a headphone type device or a speaker type device. In some examples, a speaker or a piezo device is included in the RL to provide sound output. In another example, an audio output port such as a headphone jack can be provided in the RL for a user to connect a headphone type device, or perhaps an external speaker connection.

The audio output processor can be a single tone generator circuit, a polyphonic tone generator circuit, a polyphonic synthesizer circuit, a voice synthesizer circuit, a MIDI playback circuit, or a sound playback circuit. In some examples, the audio output processor includes digital-to-analog conversion means such as from a digital-to-analog converter (DAC) circuit or from a CODEC circuit. The voice synthesizer circuit can include a text to speech interpreter. The voice synthesizer can also be arranged to provide various regional voice affectations and language accents, such as male and female voices, robotic voices, English accents, French accents, Spanish accents, etc. In some examples, the audio output processor is arrange to provide music playback that can be in any desired format such as a lossy compressed sound file, a non-lossy compressed sound file, or an uncompressed sound file. In other examples, the audio output processor device is arranged to provide playback of previously recorded sounds or user recorded sounds. The recorded sounds can be voice messages such as can be provided in character voices (e.g., cartoon characters), recordings of celebrities, or as impressions of recognizable voices. In some examples, the audio output processor can be combined in function with the audio input processor previously described.

Display circuits can also be used as an indication means for reporting visual information to a user of the RL device, as well as to provide navigation and location information. Example display circuits can provide any appropriate video output such as, for example: an LED type display, an LCD type display, an active display, a passive display, a black and white display, a monochromatic display, and/or a color display. Other example display circuits can be discrete arrangements of LEDs, seven segment displays, as well as other light emitting devices that can be used for reporting visual information. In some examples, the user interface can be integrated with the video output device such as, for example, a touch screen that is integrated with an LCD display. In other examples, the user input interface can be separate from the video output device.

The RL is operated to send a transmission that consists of a series of coded signals. The code can be generated by a unique identifier (e.g., an ID Code) that is associated with a specific MT, or in some examples with a group of MTs when the message is coded as a broadcast message. A sequence generator can be arranged to evaluate the unique identifier and create a transmit sequence (e.g., TSEQ). After the coded sequence is generated for the unique identifier, additional information can be encoded into the transmit sequence. In one example, the additional information can be command/control instructions for the MT. In another example the encoded information can be distance measurements. Only one sequence need be transmitted to accomplish communication, timing synchronization, and sequence validation. The output of the sequence generator (e.g., TSEQ) can be filtered such as by a low pass filter (LPF1) prior to coupling the signal to the transmitter block.

The transmitter block can be arranged to carrier modulate (e.g., multi-phase shift keying, binary phase shift keying, quadrature phase shift keying, differential phase shift keying, continuous phase modulation, multiple amplitude and phase shift keying, etc.) the coded signals with a carrier frequency, a spread spectrum carrier, and/or a frequency hopping method. The transmit-receive switch (SW1) can be arranged to couple the carrier modulated coded signals to the antenna (ANT1) during the transmit sequence. A band-limiting filter (e.g., BPF1) can be provided between the antenna and the transmit-receive switch (SW1) such that out-of-band signals may be ignored. The band-limiting filter (BPF1) can be any filter that provides reasonable band-limiting functions such as: a passive band-pass filter, an active band-pass filter, a surface acoustic wave (SAW) filter, a bulk acoustic wave (BAW) filter, a comb filter, a strip-line filter, to name a few.

The RL can be operated to receive and capture a transmission from the MT at appropriate times when the capture signal (e.g., CAPTURE) is asserted. The transmission from the MT may consist of another series of coded signals, which may be noise signals when a secure communication model is employed. The coded signals are received and evaluated using a variety of signal processing methods such as digital signal processing, analog signal processing, Fast Fourier Transform (FFT), correlation, inverse FFT (IFFT) to name a few. The coded signals can be generated by the MT with a unique identifier (e.g., the ID Code) that is associated with the specific MT. The receiver block can be arranged to receive carrier modulated (e.g., multi-phase shift keying, binary phase shift keying, quadrature phase shift keying, differential phase shift keying, continuous phase modulation, multiple amplitude and phase shift keying, etc.) coded signals from the antenna (ANT1) via SW1. The received signals are handled by a baseband processor that can also provide signal-processing functions. Alternatively, the baseband processor can be arranged to provide captured signals to the processor, which can be arranged to handle various signal-processing functions.

In some examples (e.g., when a secure communications mode is active), the transmission from the MT to the RL may consist of a specified noise sample pattern that is secretly known by both the MT and the RL. In this example, the baseband and signal processing block can be configured to correlate the captured samples from the receiver block with one or more of the specified noise sample patterns. When the noise sample pattern correlates with the captured samples (e.g., a correlation peak is found by a peak analyzer in the baseband and signal processing block), the captured samples are identified with the uniquely identified MT. For additional security, the capture time may be determined from a secretly known delay time (e.g., delay time setting), which may be determined by the processor using one or more of the processing logic, settings, shared keys, and/or delay times that may be stored in the memory of the RL. In some examples, the capture signal (e.g., CAPTURE) may be asserted for a capture interval that begins after a predetermined time period expires that may be established by a delay timer using various predetermined delay time settings.

The noise sample pattern(s) and/or the delay time(s) for capturing samples can be uniquely identified with a particular MT, and may be determined by the processor of the RL using one or more shared keys associated with the MT. In some examples a hash function such as a streaming cryptographic hash function (e.g., MD5, SHA-0, SHA-1, SHA-3, RIPEMD, etc.) may be applied to the shared secret key in conjunction with the unique ID Code to create an appropriate noise sample pattern for correlation and/or the appropriate delay time for capturing the samples from the receiver block of the RL.

The described RL performs distance measurement by round trip time measurement. For example, the round trip time can be determined by the difference in time between the transmission of a signal from the RL to the MT, and the subsequent reply transmission of an acknowledgement signal from the MT back to the RL, offset by any other delays. In some example implementations, the delay time is further offset by an intentional delay (e.g., secret delay time that is mutually known by the MT and the RL) that can be added for security. In these examples, the intentional delay is removed (e.g., subtracted) from the distance measurement calculation.

Various timing signals that are employed by the RL can be generated by a time control circuit as illustrated in FIG. 1A. The time control circuit may include a low noise high frequency clock that can be configured to generate one or more timing signals. The timing signals (e.g., CLK1, RCLK1, TCLK1, BBCLK1) can be used by one or more components of the system (e.g., the processor, the transmitter block, the receiver block, and/or the baseband and signal processing block) to digitally synthesize transmitter and receiver carrier wave signals from a locally generated oscillator signal in the RL.

In some example implementation, the above described remote locator (RL) can be arranged to provide a relatively high power transmission signal (e.g., 1 Watt).

In some examples, one or more previously calculated/generated noise sample patterns can be stored in the memory block and indexed for later retrieval. The RL can retrieve (e.g., via the processor) the previously stored noise sample pattern from the memory block using the secret key. The baseband and signal processing block in the RL can then preload the correlator with the appropriate values corresponding to the noise sample pattern(s) prior to a capture interval of the receiver block in the RL. The next capture interval of the receiver block can be scheduled by the processor at a predetermined time, which may be determined (e.g., by the processor) at least in part by a delay time using one of the secret shared keys. The correlator can then compare the captured samples from the receiver block with the noise sample patterns that were retrieved from the memory.

The correlator processing in the RL correlator can be adapted to process very long patterns to accommodate the secure communication mode with a large number of samples for the noise pattern. For example, a 100K sample noise pattern can be captured at a receiver capture rate of about 20 M samples/sec (Msps) over a 5 milliseconds capture interval, requiring a capture buffer of at least 100k samples. The RL correlator may further include Doppler processing capable of processing multiple spins since the duration of the capture interval of the receiver block will be considerably long and the round-trip or doubled Doppler shift will be unknown. For example, the correlator can be configured to attempt to correlate a previously stored 100K sample pattern (i.e., a noise pattern of 100K sample) over multiple spins. A Doppler shift of +−200 Hz or a multiple thereof will result in a null from the correlator. Degradation in accuracy may occur for frequency offsets that exceed about 100 Hz, which corresponds to a round trip shift of about 110 ppb. The Doppler processing may attempt to spin or twist either the captured pattern or the noise sample pattern over an the pattern by an integer number of spins (e.g., 0, ±1, ±2, ±3, etc.) so that the correlation of the captured pattern will be determined to match along with the precise number of turns.

In some example implementations, each noise sample pattern is stored in the memory along with each of the possible integer rotations (turns in frequency rotation) of the noise sample pattern.

EXAMPLE MICRO-TRANSPONDER (MT)

FIG. 18 illustrates an example MT that is arranged to communicate with a RL in accordance with one or more aspects of the present disclosure. The MT can be arranged to receive a coded transmission signal, such as previously described, from the RL with a second receiver block via switch SW2 and antenna ANT2. Optionally, a band-limiting filter (e.g., BPF2) can be used to minimize interference from out-of-band signals in the receiver and/or to prevent interference with other devices. The second receiver block can be configured to demodulate the carrier frequency and provide I and Q information, which can subsequently be captured by a capture buffer (e.g., a digital capture buffer such as memory, or an analog capture buffer). The capture buffer can provide output signals in the form of data to a correlator, which can correlate the decoded transmission with the unique identifier (ID code) associated with the MT.

The MT includes a processor that can be any appropriate processing means including but not limited to at least one: micro-processor, micro-controller, CISC processor, RISC processor, application specific integrated circuit (ASIC), to name a few. The processor can be arranged to: receive and evaluate inputs, control outputs, log data, retrieve logged data, and execute programs. The processor of the MT can thus arranged to communicate with any number of circuit components such as: a time control circuit, a sleep timer circuit, a delay timer circuit, a sequence generator circuit, a storage circuit (not shown), a baseband and signal processing circuit, and/or a memory circuit.

The processor in the MT can be arranged to apply processing logic to activate and deactivate a variety of operating modes as will be described. The processing logic and any related settings for the MT can be provided in a read-only memory (ROM) that is loaded into a conventional memory for execution by the processor, or by some equivalent mechanism such as a non-volatile memory (NVM), a flash memory device, and hard-coded instructions in a micro-controller, to name a few. In another example, the processor and memory can be replaced with a programmable logic device (PLD), a specially designed circuit such as an application specific integrated circuit (ASIC), as well as others devices that are arranged to provide similar functionality. It is important to note that the processor in the MT of the present disclosure can be arranged to apply processing logic in response to signals that are received from the RL.

Although not shown in FIG. 1B, the various input and output mechanisms described previously with respect to the RL may be similarly adapted for use with an MT, including but not limited to the various user input and output devices described previously.

The processor in the MT of the present disclosure can be arranged to cooperate with a compass sensor device (not shown) or some similar means for determining a rotational position of the MT device. The compass sensor can be an integrated circuit, a discrete circuit, or some other device that is arranged to provide compass sensor information that is related to a directional orientation of the MT. The compass sensor can be a digital compass device or an analog compass device that is arranged to work with an analog-to-digital converter, for example, to provide a comparable function.

In some examples, distance can be reported with display circuit in an alphanumeric representation (e.g., 100, 100', 100 ft, 100 m, etc.). In other examples, distance can be reported in a graphical representation such as an icon, a line, or other graphical shapes. Similarly, direction can be reported in either an alphanumeric representation (e.g., N, S, E, W, NE, SE, NW, or SW) or in a graphical representation. Any combination of graphical and alphanumeric representations can also be made.

When the MT is active (i.e., not in a sleep or low power mode), the MT is adapted to evaluate (e.g. via baseband and signal processing block) captured samples of the signal transmission spectrum that are captured by the receiver block. The samples may be stored in a capture buffer (e.g., an analog or digital capture buffer depending on the implementation). Various processing methods are employed to perform baseband processing and signal analysis in the MT, including a correlator block, a correlation memory, a peak analyzer block, a reference pattern block, and a signal analyzer block. The correlator block may include an FFT correlator and a direct-form correlator. The signal analyzer can be arranged to evaluate the outputs from the correlator block using a variety of signal processing techniques (e.g., digital signal processing, analog signal processing, Fast Fourier Transform (FFT), correlation, inverse FFT (IFFT), peak detection, etc.), and determine if the received transmission sequence is identified with the specific MT. When the sequence is appropriately identified with the specific MT, various timing signals can be adjusted such that the frequency and phase of the digitally synthesized transmitter and receiver signal(s) are precisely aligned in the MT. Information from the coded signals received from the RL can be extracted by the processor once the captured transmission sequence is validated. Such information can include command and control instructions for the MT such as, for example, set sleep interval to a new time lapse (e.g., 10 minutes), log receiver signal strength, log invalid received signals, log receiver frequency and phase, transmit logged data, change operating mode, switch to secure communications mode, switch to unsecure communications mode, etc.

A reply message can be transmitted from the MT to the RL such that the RL can identify, locate, and receive data from the MT. The reply message sequence (e.g., RSEQ) can be generated with a reply sequence generator that can be keyed from the unique identifier (ID Code), similar to the transmit sequence generator. An optional low pass filter (e.g., LPF2) can be placed between the sequence generator and the transmitter block in the MT. The transmitter block is coupled to antenna ANT2 via switch SW2 to cause the coded reply transmission. The MT, using as its time base the Doppler shifted frequency of the signal from the RL, subsequently transmits a reply sequence back to the RL, which is similarly coded. The RL receives the coded transmission, and processes the incoming signals in a similar fashion as the MT.

In some examples (e.g., when a secure communications mode is active), the transmission from the MT to the RL may consist of a specified noise sample pattern that is secretly known by both the MT and the RL. In this example, the reply sequence corresponds to one of the noise sample patterns that are identified with the uniquely identified MT. For additional security, the transmit time may be determined from a secretly known delay time (e.g., delay time setting), which may be determined by the processor of the MT using one or more of the processing logic, settings, shared keys, and/or delay times that may be stored in the memory of the RL. In some examples, the transmit signal (e.g., TRANSMIT) may be asserted for a transmit time interval that begins after a predetermined time period expires that may be established by a delay timer using various predetermined delay time settings.

The noise sample pattern(s) and/or the delay time(s) for transmitting with the transmitter block can be uniquely identified with a particular MT, and may be determined by the processor of the MT using one or more shared keys associated with the MT. In some examples a secure cryptographic streaming hash function (e.g., MD5, SHA-0, SHA-1, SHA-3, etc.) may be applied to the shared secret key in conjunction with the unique ID Code to identify or create the appropriate noise sample pattern for transmission and/or the appropriate delay time for transmitting the noise samples with the transmitter block of the MT.

Since an example MT may be configured to operate with limited energy, the MT can be adapted to operate in a low power or sleep mode. The energy consumed in the sleep mode is sufficient to operate a sleep timer that operates from a low frequency clock. According to a pre-determined time interval, the MT can be activated (e.g., wakeup is asserted by the sleep timer) and the MT looks for a signal to receive while operating a high frequency clock. When no identifiable signal can be received, the MT can return to the sleep mode, where the high frequency clock is disabled. The high frequency clock can be enabled and disabled by a respective control signal (e.g., HF EN). The MT can also be activated by the user such as by pressing a user input device (e.g., a button).

Various timing signals that are employed by the MT (or MT) are generated by a time control circuit as illustrated in FIG. 1B. The processor is operated from one clock signal (CLK2), while the transmitter and receiver in the MT are operated by other clock signals (TCLK2 and RCLK2). The various timing signals are used by the system to digitally synthesize transmitter and receiver carrier wave signals from a locally generated oscillator signal in the MT.

The time control circuit can include additional functionality to calibrate the high frequency clock with a calibration logic circuit. The calibration logic circuit can include any number of high frequency counters (HF CNTR), low frequency counters (LF CNTR), and digital comparator circuits (COMP), as well as other logic circuits such as registers, latches and related logic. In operation the calibration logic can be enabled when a calibration signal (not shown) is asserted, such as in response to the processor when applying processing logic.

The transponder (MT) can be arranged to synthesize its own internal frequency for transmitting an acknowledgement signal by using the timing information that it acquires from the RL. The timing information that is received from the RL by the MT is Doppler shifted relative to the original transmission frequencies from the RL. The resulting synthesized frequency of the MT, while extremely accurate, corresponds to a Doppler shifted version of the original transmission frequencies form the RL. The acknowledgment signal from the MT is received by the RL, but is again Doppler shifted relative to the transmitting frequencies from the MT. The Doppler shift that result from the round trip of the signal transmissions (i.e., transmission from the RL to the MT, and reply transmission from the MT to the RL) is hereinafter referred to as the synthetic round-trip Doppler Shift.

EXAMPLE NOISE SAMPLE PATTERN GENERATOR

Figure 1C:
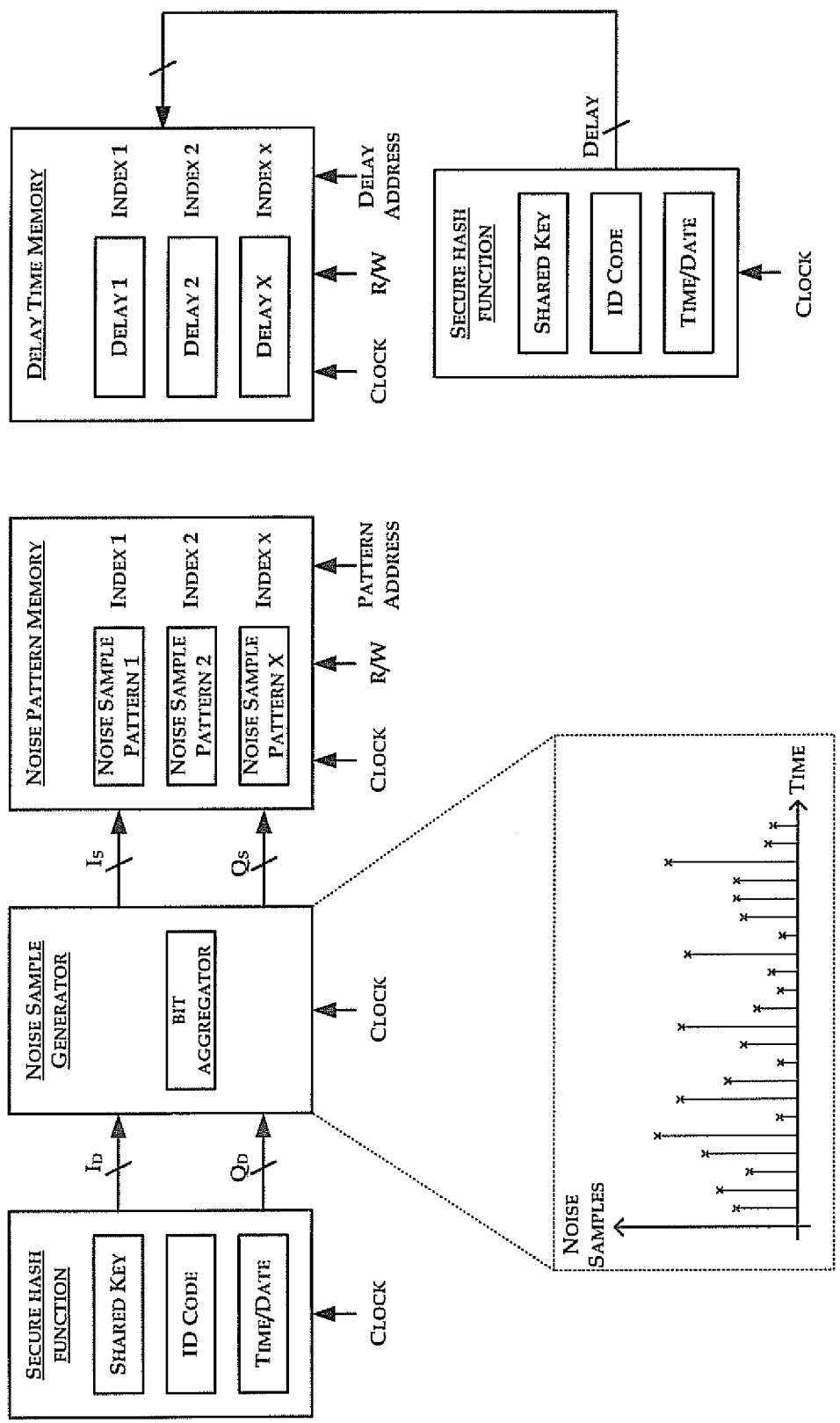
FIGS. 1C and 1D illustrate example sources that can be used to generate noise sample patterns and delay times that are used by the RL and the MT in a secure communication system.

FIG. 1C illustrates example sources for generating noise sample patterns and delay times that are used by the RL and the MT in accordance with at least some examples described herein.

As illustrated in FIG. 1C, a noise sample pattern generator may include one or more of a secure hash function block, a noise sample generator block, and a noise pattern memory block. The secure hash function block is configured to generate a complex stream of data bits (ID and QD). Each stream may correspond to multi-bit values. The secure hash function may be a secure streaming cryptographic hash function (e.g., MD5, SHA-0, SHA-1, SHA-3, RIPEMD, etc.) that is adapted to create a hash using any variety of secret information that may be mutually known by both the RL and the MT. For example, the MT and RL may both have one or more secured shared key(s). In one example, the secure hash function may utilize the unique ID Code associated with a specific MT. In another example, the secure hash function may utilize a time of day and/or calendar date. Some examples hash functions may be implemented as a secure cryptographic streaming hash function.

The noise sample generator block is configured to receive the bit stream from the secure hash function (ID, QD) and generate samples of a noise signal that includes I and Q noise signals (IS and QS). The noise sample generator block includes a bit aggregator that is configured to aggregate the data bits received from the bit stream into data words. The data words correspond to values associated with a noise signal, and can thus be referred to as noise samples. As time progresses, the changing values of the noise samples appear as random noise as is illustrated by the graph of FIG. 1C.

The noise pattern memory block is configured to receive the noise samples (IS, QS) from the noise sample generator, and store them as indexed noise sample patterns, which are illustrated as Noise Sample Pattern 1, Noise Sample Pattern 2, ... Noise Sample Pattern X. The noise sample patterns can be retrieved at a later time (e.g., by a processor) by providing a pattern address (e.g., over an address bus) that corresponds to one of the indexed pattern.

As also illustrated in FIG. 1C, a delay time generator block may include one or more of a secure hash function block, and a delay time memory block. The secure hash function block is configured to generate a multi-bit data word (DELAY) that corresponds to the a delay time value. The secure hash function may be a cryptographic hash function that is adapted to create a hash using any variety of secret information that may be mutually known by both the RL and the MT. For example, the MT and RL may both have one or more secured shared key(s). In one example, the secure hash function may utilize the unique ID Code associated with a specific MT. In another example, the secure hash function may utilize a time of day and/or calendar date.

The delay time memory block is configured to receive the delay times from the secure hash function, and store them as indexed delay times, which are illustrated as Delay 1, Delay 2, ... Delay X. The delay times can be retrieved at a later time (e.g., by a processor) by providing a delay address (e.g., over an address bus) that corresponds to one of the indexed delay times.

The noise sample patterns can be perceived as a wide band noise signal similar to a Gaussian noise that has complex values. In some examples the noise samples may be used as a series of complex amplitude modulated signals, where IS and QS correspond to randomly or pseudo-randomly generated signals that have varying amplitudes. In some other examples, the noise samples may be used as a series of angle or phased modulated signals, where an angle associated with the IS and QS signals are modulated according to a random or pseudo-random series of signals. In still other examples, the noise signals may be generated as a series of frequency modulated signals that are modulated according to a random or pseudo random series of frequencies.

The number of samples that can be captured for the noise patterns can be quite long (e.g., more than about 65K samples and up to about $10^6$ samples). The use of long patterns of noise signals mean that the noise signal has a low probability of interception since the power for the signals can be quite low, and the pattern is not a repeating pattern but instead a very long sequence that looks like or corresponds to a noise signal, which may correspond to any variety of captured noise such as captured thermal noise. For example, with a 100K sample pattern (i.e., 100,000 samples from a noise signal that is used as a pattern for security), there is an effective spreading gain of about 50 dB, which may be detected at a pre-dispreading signal-to-noise ratio of about −35 dB.

In some example implementation, the selection of the noise pattern can be changed according to a predetermined schedule so that the same noise pattern is not reused for long periods of time. After the noise samples are generated and stored as patterns in a memory, the noise sample patterns can be used by the RL for correlation. In some examples, the RL and MT may not actually include the noise generator and noise capture blocks, and instead may simply have a storage such as a memory that can be used for storage and retrieval of previously determined noise sample patterns. At the time of use, the RL or MT may be configured to retrieve the noise sample patterns from memory.

Since the noise patterns correspond to samples, when transmitted they may result in jagged edges that could be sensed by an interceptor. To avoid such possible interception, the noise samples can be band-limited in by passing the values through a low pass filter (LPF) function and storing the filtered version of the noise patterns in the noise pattern memory. The low pass filter function can be implemented in the noise sample generator in some examples. In some other examples, the samples of the noise pattern are not filtered, and instead the carrier modulated signal that uses the noise sample pattern is band-pass filtered.

Figure 1D:
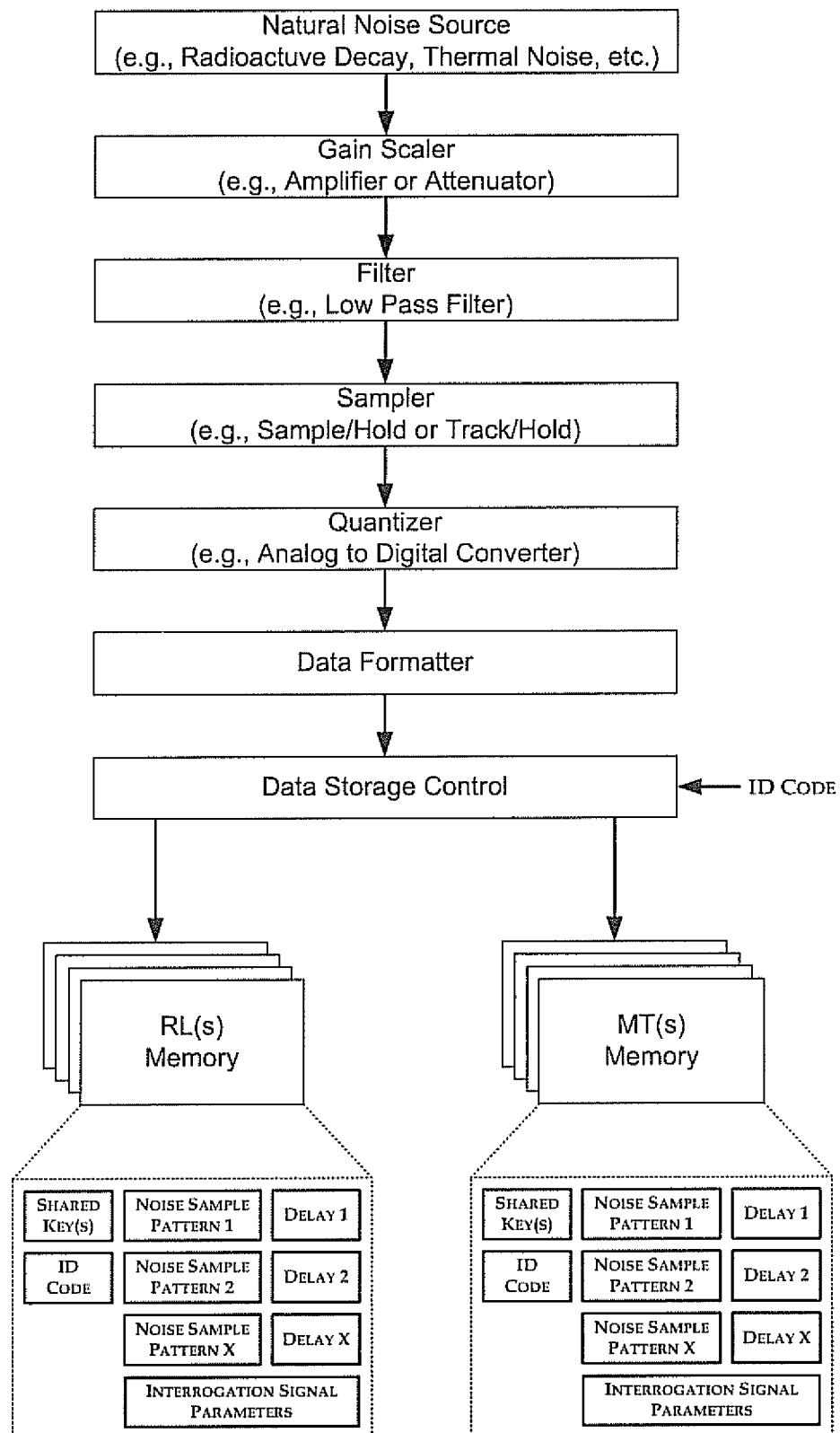

FIG. 1D illustrates another example source for generating noise sample patterns and delay times that are used by the RL and the MT in accordance with at least some examples described herein. As illustrated in FIG. 1D, a natural noise source (e.g., a radioactive decay source or a thermal source) can be utilized to generate a noise signal in the time domain. Optionally, the noise signal can be coupled from the natural noise source to a gain scaler device (e.g., an amplifier or attenuator) so that the amplitude of the noise signal can be adapted for quantization. The gain scaled noise signal can be coupled to a filter (e.g., a low pass filter), where the coefficients of the filter can be selected to smooth out the edges of the noise signal and thus band limit the noise signal before quantization. The filtered noise signal can be coupled to a sampler (e.g., a sample/hold circuit or track/hold circuit), which is configured to sample the noise signal at some regular rate (e.g., by a sample clock signal). The sampled noise signal can be coupled to a quantizer (e.g., an analog-to-digital converter), which converts the sampled noise signal into digital data. The digital data can be coupled to a data formatter, which can format the data as either parallel data or serialized data for storage in a memory of a particular type. The formatted data can be coupled a storage control, which is configured to store the formatted data in a memory that is keyed to a specific ID code of an MT.

FIG. 1D also illustrates an example environment such as a manufacturing environment, where the various security keys, ID codes, noise sample patterns, and/or delay times can be synchronized between the RL and MT. The formatted data that corresponds to a particular noise signal that is generated by the thermal noise source is stored in the memory for both an RL and an MT. The formatted data is also indexed so that the RL is fully aware of the specific noise sample patterns (Noise Sample Pattern 1, Noise Sample Pattern 2 . . . Noise Sample Pattern X) that the MT will utilize when operated in the field. In some examples, the formatted data is indexed by the ID Code associated with the MT. In some other examples, the formatted data is indexed by one or more mutually shared secret key(s). In still additional examples, the MT and the RL are mutually aware of a secure hashing function (see prior discussion above for FIG. 1C) that may be utilized to access the Noise Sample Patterns. Similarly, the delay times (Delay 1, Delay 2 . . . Delay X) for the MT can be stored in the memory of both the MT and the RL, and indexed for retrieval in the same manner as the noise sample patterns. Also, various interrogation signal parameters for the interrogation signal can be stored in the memory of the MT and the RL.

EXAMPLE SECURE RECEIVER CORRELATION

Figure 1E:
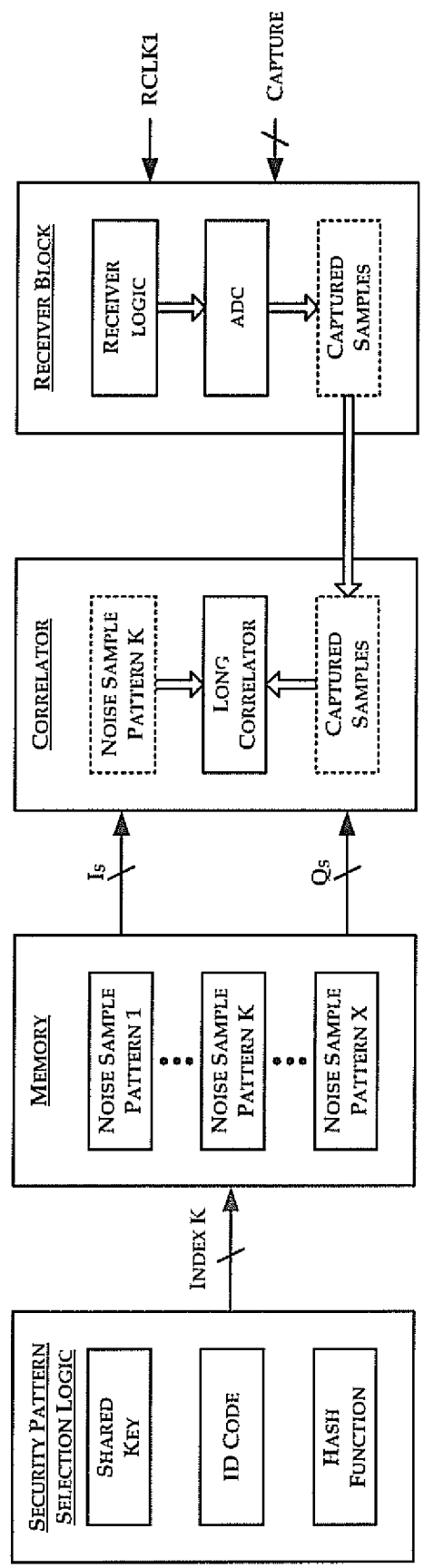
FIG. 1E illustrates the functional operation of an example receiver configured to capture samples and correlate against noise sample patterns in a secure communication system.

FIG. 1E illustrates the functional operation of an example receiver configured to capture samples and correlate against noise sample patterns in a secure communication system that is arranged in accordance with at least some examples described herein. The operation of the receiver may include a security pattern selection logic block, a memory block, a correlator block, and a receiver block.

The security pattern selection logic block in FIG. 1E is configured to generate an index (e.g. index K) that can be used to select a noise sample pattern that was previously stored in memory. The security pattern selection logic block may comprise a hash function that creates a hash (e.g., MD5) of the shared key and the unique ID Code associated with a specific MT. The security pattern selection logic block may also utilize other factors such as time-date stamps in the hash function to create a dynamically generated index that is used to select a noise sample pattern.

The memory block in FIG. 1E is configured to store one or more noise sample patterns, which are illustrated as Noise Sample Pattern 1 . . . Noise Sample Pattern K . . . Noise Sample Pattern X. The noise sample patterns each correspond to the normalized samples that were previously stored from a noise source, such as patterns previously generated by a noise source of FIG. 1C. One of the previously stored noise sample patterns (e.g., Noise Sample Pattern K) can be retrieved from the memory block using the index (e.g., Index K) from the security pattern selection logic block. The retrieved noise sample pattern may include normalized samples of both in-phase (ISN) and quadrature-phase (QSN) portions of a previously stored noise sample pattern.

The Receiver Block is configured to capture signals when a capture (CAPTURE) signal is asserted at an appropriate time that is identified with one or more of delay times as will be described later. The captured signal can be processed by the receiver logic using the receiver clock signal RCLK1, and quantized into digital data with an analog-to-digital converter (ADC), to generate captured samples.

The correlator block in FIG. 1E is configured to correlate samples from the noise sample pattern (e.g., Noise Sample Pattern K) retrieved from the memory block against the captured samples generated by the receiver block. The correlator block includes a long correlator in the sense that the long correlator has the ability to process very long patterns. For example, as discussed previously, the number of samples that can be utilized for the noise patterns can be quite long (e.g., more than about 65K samples and up to about $10^6$ samples).

EXAMPLE CORRELATORS

Figure 1F:
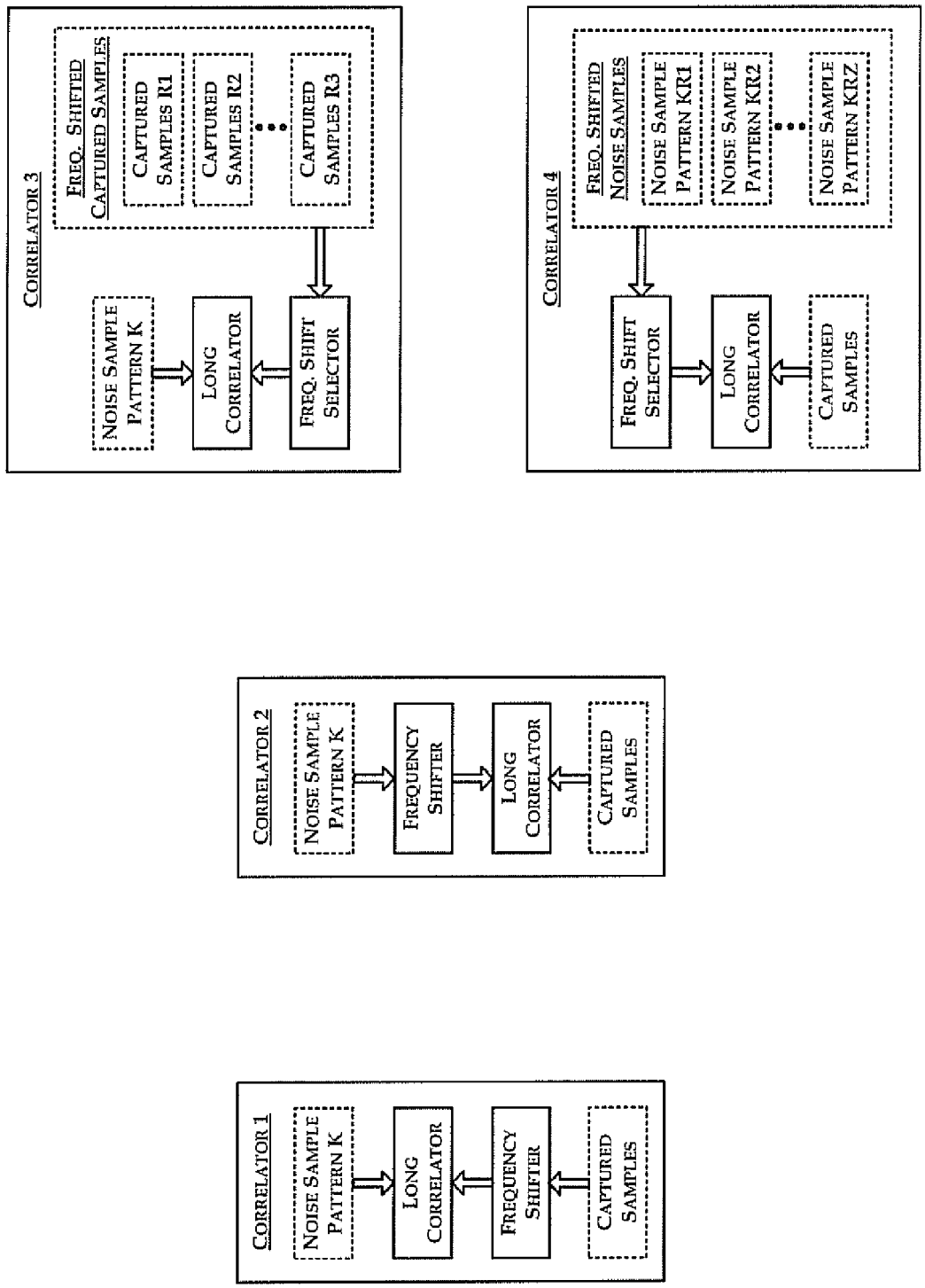
FIG. 1F illustrates example correlator blocks that can be used to correlate noise sample patterns in a secure communication system.

FIG. 1F illustrates example correlator blocks that can be used to correlate noise sample patterns in a secure communication system that is arranged in accordance with at least some examples described herein.

In each of the example correlators described below, the correlation of the noise sample pattern (i.e., the previously determined noise pattern used for security) is compared against captured samples. However, it is important to note that the transmission of the noise sample patterns in a communication signal is encoded in a modulated carrier wave (both I and Q portions), which is traveling though space between transponders which may be in relative motion. In other words, it is expected that there will likely be some amount of Doppler shift between the transmission and reception of the signals, which should be accounted for in the correlator processing. The amount of frequency difference or intra noise pattern rotation due to Doppler shift requires correlator processing to heterodyne or spin a small positive or negative frequency. For example, at 915 MHz with a sample pattern that lasts for about 100,000/25 MHz or about 4 milliseconds, then modest Doppler shifts of movement at 100 meters/second (e.g, a slow moving airplane) times 2 for round trip transmission reception would give a total potential intra-packet rotation of 2.44 turns or spins. In order to account for the intra-packet rotation, the correlation processing may utilize a frequency rotator that calculates trial spins (either positive or negative) across the packet of ±0, 1, 2, 3, 4, etc. This variable rotation or spin is a function of time, or frequency shift.

In a first example correlator block (Correlator 1), captured samples such as from a receiver are provided to a frequency shifter block, which is configured to frequency shift the captured samples by a specified number of trial frequency shifts. For a given trial spin, the frequency shifter provides the frequency shifted captured samples to the long correlator block, which correlates the previously selected noise sample pattern (e.g., noise sample Pattern K) against the frequency shifted captured samples. Correlator 1 can be configured to continue attempting different trial frequency shifts until either correlation is found, or all of the trial frequency shifts are attempted without finding a correlation.

In a second example correlator block (Correlator 2), the noise samples pattern (e.g., Noise Sample Pattern K) such as from a memory block are provided to a frequency shifter block, which is configured to frequency shift the noise sample pattern by a specified number of trial frequency shifts. For a given trial frequency shift, the frequency shifter provides the frequency shifted sample pattern to the long correlator block, which correlates the frequency shifted noise sample pattern (e.g., noise sample Pattern K) against the captured samples. Correlator 2 can be configured to continue attempting different trial frequency shifts until either correlation is found, or all of the trial frequency shifts are attempted without finding a correlation.

In a third example correlator block (Correlator 3), captured samples such as from a receiver are provided to a frequency shifter block (not shown), and all trial frequency shifts or spins are determined before correlation, and perhaps stored in a memory block (not shown). For example, Captured Samples R1 may correspond to a first trial spin of 0, while Captured Samples R2 may correspond a second trial spin of −1, and Captured Samples R3 may correspond to a third trial spin of +2. In this example a frequency shift selector can be used to select one of the frequency shifted captured samples from the buffer or memory for correlation, where the long correlator block correlates the previously selected noise sample pattern (e.g., noise sample Pattern K) against the frequency shifted captured samples (Captured Samples R1, R2, R3, etc.). Correlator 3 can be configured to continue attempting different trial frequency shifts until either correlation is found, or all of the trial frequency shifts are attempted without finding a correlation.

In a fourth example correlator block (Correlator 4), a previously stored noise sample pattern may have been previously shifted by a frequency shifter block (not shown), where all trial frequency shifts or spins for each noise sample pattern are determined before correlation, and perhaps stored in a memory block (not shown). For example, Noise Sample Pattern KR1 may correspond to a first trial spin of −2, while Noise Sample Pattern KR2 may correspond a second trial spin of +1, and Noise Sample Pattern KR3 may correspond to a third trial spin of 0. In this example, a frequency shift selector can be used to select one of the frequency shifted noise sample patterns from a buffer or memory for correlation, where the long correlator block correlates the selected frequency shift of the noise sample pattern (e.g., noise sample Pattern K) against the captured samples. Correlator 4 can be configured to continue attempting different trial frequency shifts by retrieving different noise sample patterns from the buffer or memory until either correlation is found, or all of the trial frequency shifts are attempted without finding a correlation.

EXAMPLE TRANSMITTER

Figure 2A:
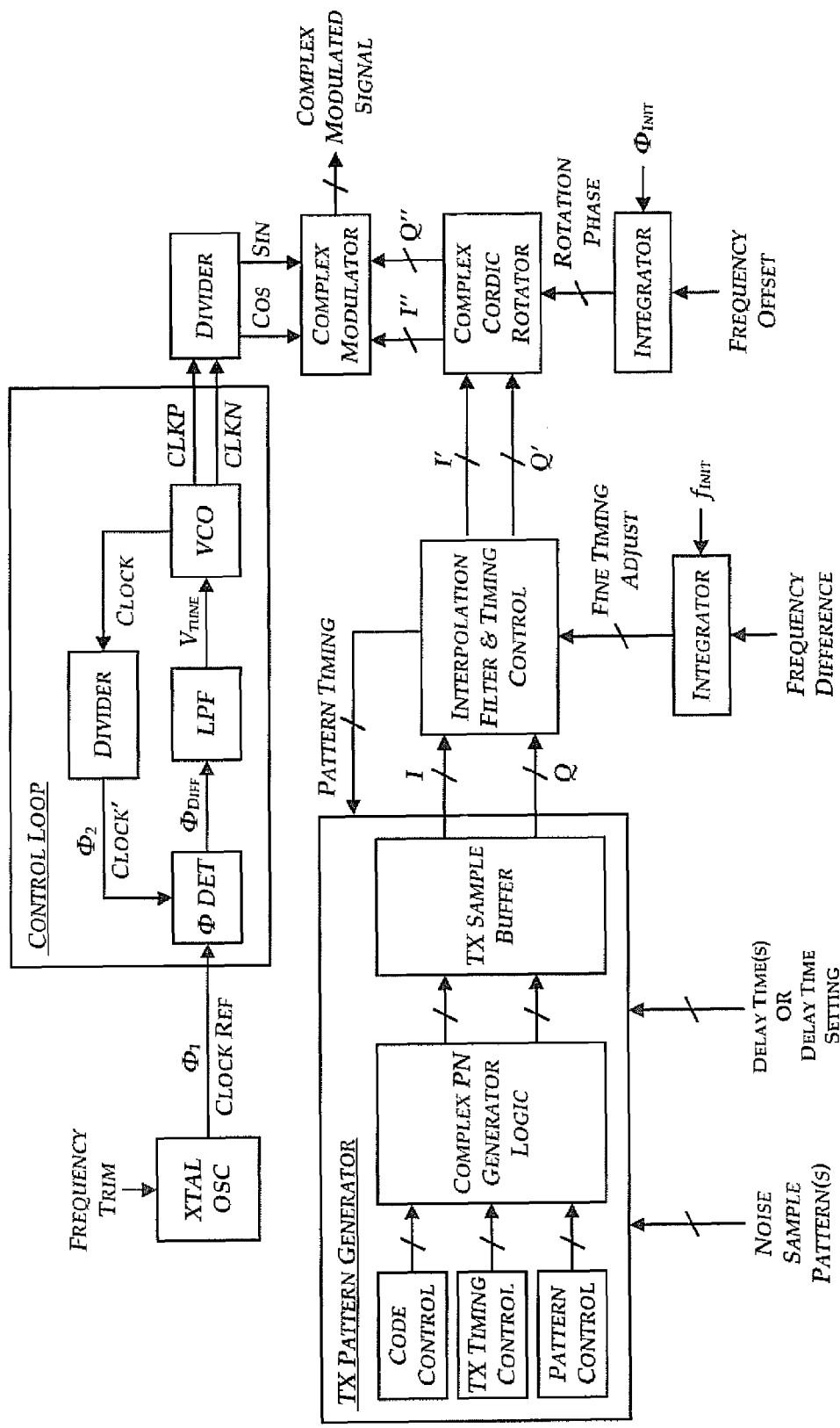
FIGS. 2A and 2B illustrate various portions of an example transmitter.
Figure 2B:
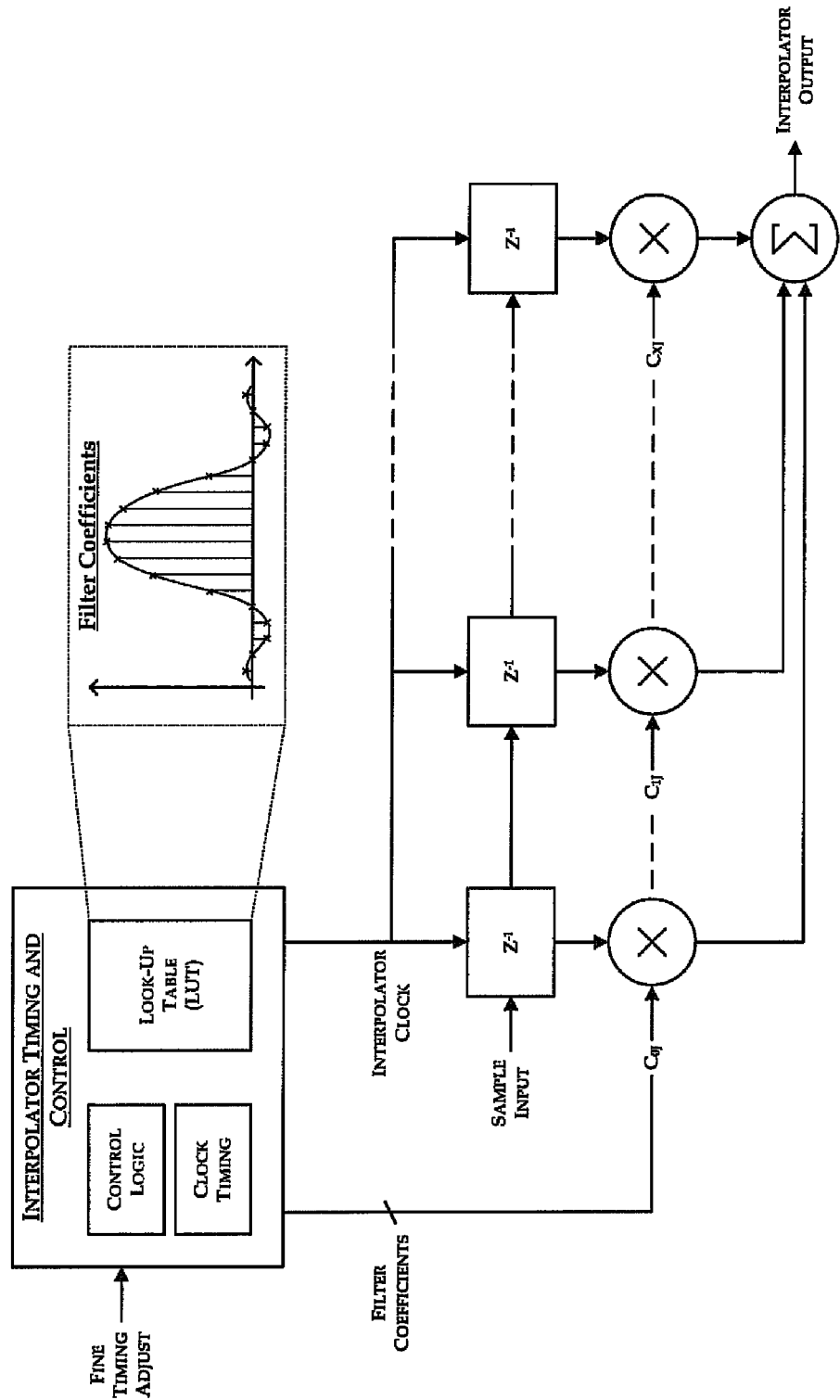

FIGS. 2A and 2B illustrate various portions of an example transmitter that is configured in accordance with at least some examples described herein. FIG. 2A shows the overall transmitter topology, while FIG. 2B shows an example interpolator. The example transmitter includes a crystal oscillator (XTAL OSC), a timing control circuit, a complex modulator, a transmit pattern generator, an interpolation filter with timing control, integrators, and a complex cordic rotator.

The crystal oscillator is arranged to provide an oscillator signal as a clock signal (CLOCK REF) having a first phase ($\phi_1$) for the timing control circuit. In one example the crystal oscillator has a nominal frequency around 26.14 MHz, which can optionally be adjustable (e.g., via signal FREQ. TRIM). The oscillator can be a crystal-type oscillator, or any other oscillator that has a substantially stable oscillation frequency.

The timing control circuit includes a feedback control loop with an optional divider circuit that is arranged to synthesize a frequency. The control loop includes a phase detector, a low pass filter (LPF), a voltage controlled oscillator (VCO), and an optional divider circuit. The phase ($\phi_1$) of the reference clock signal (e.g., $CLOCK_{REF}$) is compared to a phase ($\phi_2$) from a feedback signal (e.g., CLOCK') by the phase detector to determine if the resulting clocks signal (CLOCK) is operating in phase with the reference clock ($CLOCK_{REF}$). The output of the phase detector corresponds to a phase difference signal ($\phi_{DIFF}$), which is provided to the low pass filter to generate a control voltage (VTUNE) for the VCO. The VCO is configured to adjust the output frequency of clock signals CLKP and CLKN, which are out of phase with one another by 180 degrees. The feedback signal (CLOCK) is also provided from the VCO to the optional divider circuit. The output of the divider circuit is provided to the phase detector as signal CLOCK', which closes the control loop. Moreover, the VCO frequency can optionally be provided to another divider circuit, which generates synthesized frequencies that are associated with a sine and cosine function.

In one example, the VCO has a nominal output frequency of 1.83 GHz, the feedback loop divider circuit has a divide ratio of 70, and the phase detector is arranged to adjust the VTUNE signal via the low pass filter such that the average value of the 26.14 MHz signal is matched to 1.83 GHz/70. Other reference signals can be employed to yield the same result by adjusting the divider ratio in the control loop divider circuit. Moreover, the output of the VCO can be further adjusted by the output divider circuit (e.g., divide ratio of 2) to yield synthesized frequencies corresponding to SIN(915 MHz) and COS(915 MHZ) or any other desired frequency.

The transmitter (TX) pattern generator includes a code control block, a transmitter (TX) timing control block, a pattern control block, a complex pseudo-noise (PN) generator logic block, and a transmitter (TX) sample buffer block. The code control block is arranged to provide the pre-determined patterns, keyed from an ID Code, for "A", "B", and "C" sequenced patterns as will be described later. In some examples, the complex pseudo-noise (PN) generator logic block is configured to generate complex numbers (e.g., I and Q) from the codes based on the timing signals (pattern timing) for sequencing the pattern. For example, the complex PN generator logic block can be arranged to provide 2047 complex numbers. The complex sequence (I and Q) is provided to an interpolation filter and timing control block, which is arranged to adjust the fine timing associated with the I and Q signals, and provides I' and Q', which are associated with a complex interpolated baseband signal. An integrator circuit is used to integrate the difference between the transmitted and received frequencies to adjust the fine timing (fine timing adjust).

The interpolator is configured to provide fine timing adjustment for the I and Q complex numbers (e.g., 8192/2047) that are generated by the TX pattern generator, and may also be configured to provide low-pass filtering for the transmitter. An example of interpolation functions is shown in FIG. 2B, where the example interpolator includes an interpolator timing and control logic block, and a finite inpulse response (FIR) interpolation filter that can be implemented by a digital signal processor (DSP) or some other similar device. The interpolator timing and control block can include a control logic block, a clock timing block, and a look-up table (LUT). The control logic block is configured to retrieve filter coefficients from the look-up table based on the fine timing adjust signal, where the fitter coefficients can correspond to a transverse polyphase filter. The clock timing block can be configured to generate an interpolator clock for the filter, which may have a series of delay elements, multipliers and summers as illustrated. The filter is adapted to generator an interpolator output by applying the filter coefficients to the input signal, which can correspond to the sample input for either I or Q signals.

An integrator circuit is configured to evaluate a frequency difference and generate the fine timing adjust signals for use by the interpolator. The integrator can be initialized by an initialization parameter for frequency and/or phase such as $f_{INIT}$ and/or $\phi_{INIT}$.

The interpolated complex baseband signals (I' and Q') are provided to the cordic rotator. The cordic rotator adjusts the rotational phase of the complex baseband signals (in the digital domain) in response to a phase adjustment signal (e.g., rotation phase). The phase adjustment signal (Rotation Phase) can be provided by another integrator that is configured to integrate the frequency offset. The integrator circuit can again be initialized by an initialization parameter such as $f_{INIT}$ and/or $\phi_{INIT}$. The output of the complex cordic rotator is a frequency shifted complex baseband signal (I" and Q"), where the frequency shifting is undertaken by the digital synthesis operations by the interpolation filter and the cordic rotator.

The complex modulator is arranged to receive the frequency shifted complex baseband signals (I" and Q"), and the sine and cosine timing signals to provide a modulated signal output. The modulated signal output can be provided to a power amplifier (not shown) that is coupled to an antenna for transmission of the modulated signal. The various timing control signals (e.g., clock frequency, clock phase, clock offset) are adjusted such that the rate, fine-timing, and phase of the modulated signal output has sufficient timing information embedded in the resulting signal.

The code control block can be generate the transmitter sequence using the unique identifier (ID Code) associated with an MT or a group of MTs when the transmitter is operated in a reduced security communication mode. In one example, the unique identifier is provided to a polynomial generator. In another example, the unique identifier is stored in a volatile memory. In yet another example, the unique identifier is stored in a non-volatile storage such as a flash memory device, a ROM, an EPROM, an EEPROM, a dip-switch, or some other means. In still another example, the pattern that was created with the ID code is stored in a memory device or a look-up table instead of the unique identifier.

The pattern control block can be configured to generate the transmitter sequence using one of the noise sample patterns when the transmitter is operated in a high security communication mode. The selection of the noise sample pattern can be determined based on the unique identifier (ID Code), the secret key that is shared with the RL and MT, a hash function as previously discussed, as well as any other suitable method that provides a matched selection of one of the noise sample patterns by the RL and the MT without any further communication between the RL and the MT. In one example, one of the noise sample patterns can be selected for transmission by loading the noise sample pattern in the TX sample buffer. In another example, one of the noise sample patterns is selected for transmission, and data is rotationally encoded in the selected noise sample pattern before loading the noise samples into the TX sample buffer.

The TX timing control block can be configured to delay the transmitter sequence from being generated and/or transmitted in response to a selected one of the delay time settings. The selection of the delay time(s) can be determined in a similar manner to the selection of the noise sample patterns when the transmitter is operated in a high security communication mode. For example, the selection of the delay settings can be determined based on the unique identifier (ID Code), the secret key that is shared with the RL and MT, a hash function as previously discussed, as well as any other suitable method that provides a matched selection of one of the noise sample patterns by the RL and the MT without any further communication.

EXAMPLE TRANSMISSION SEQUENCE

Figure 3A:
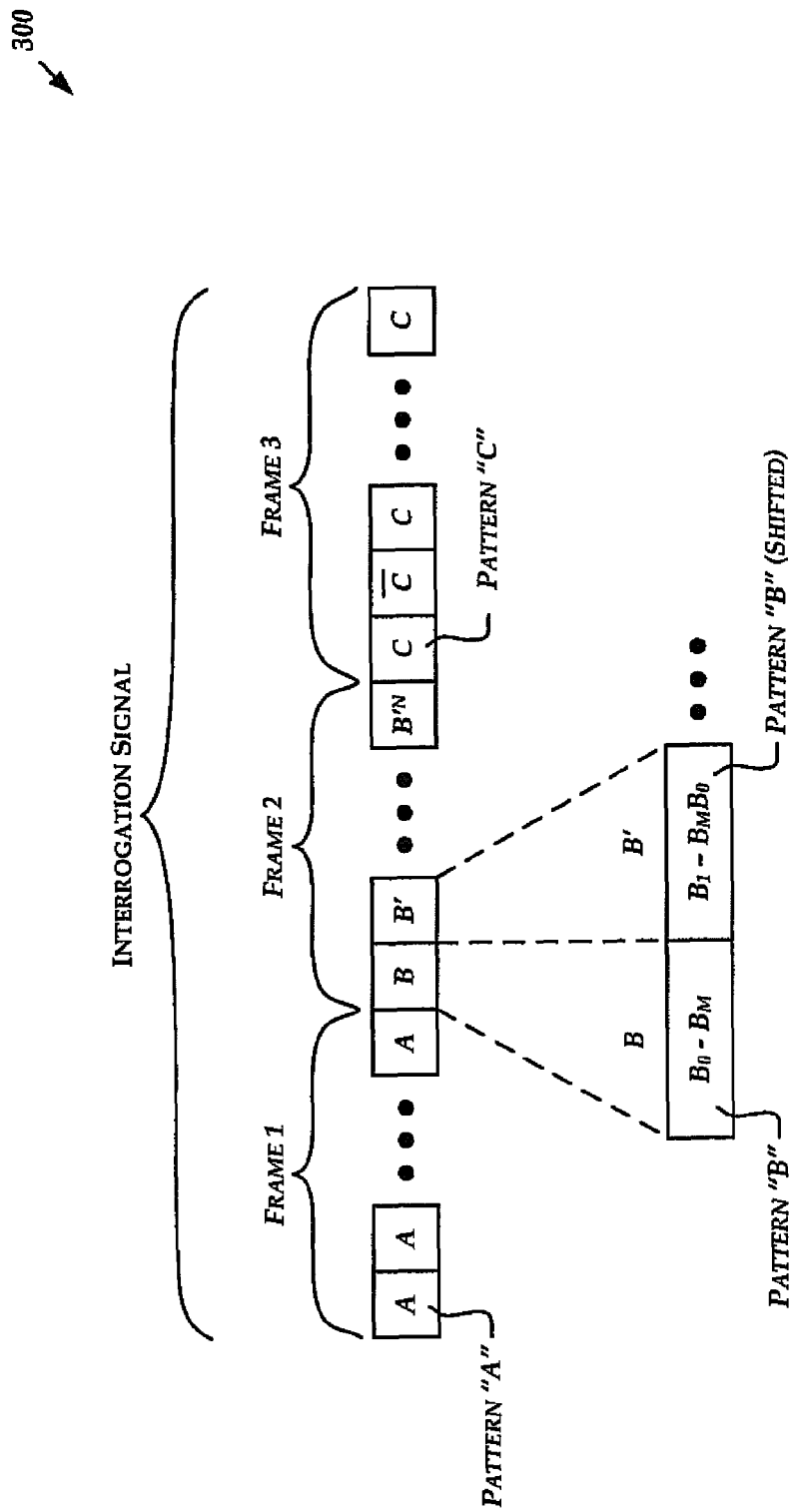
FIG. 3A is a diagram illustrating an example interrogation signal.

FIG. 3A is a diagram illustrating an example interrogation signal that is arranged in accordance with at least some examples described herein. The interrogation may correspond to a set of frames formatted for transmission, where a frame corresponds to a time-period for which a sequence is transmitted. For the example of FIG. 3A, transmissions are broken into three sequential frames. During a first time-period, a first frame (i.e., "frame 1") is transmitted that consists of a first transmission sequence (i.e., "sequence A"). Sequence A consists of a repeated set of patterns that are in a sequential series, where each pattern (pattern A) is substantially identical. During a second time-period, a second frame (i.e., "frame 2") is transmitted that consists of a second transmission sequence (i.e., "sequence B"). Sequence B consists of a repeated set of patterns that are in a sequential series, where each subsequent pattern in the sequence is shifted as will be described later. During a third time-period, a third frame (i.e., "frame 3") is transmitted that consists of a third transmission sequence (i.e., "sequence C"). Sequence C consists of a repeated set of patterns, where each pattern (pattern "C") forms part of an encoded message as will be described later. The collection of the three sequential frames in a transmission can be referred to as an interrogation signal.

Each MT in the system has a unique identifier (e.g., an M-bit address) that is used to uniquely designate a specific MT. In one example, the unique identifier is a 33-bit address code that yields approximately 8.58 billion unique identifiers. The M-bit address can be dispersed over the various patterns. In one example, a 33 bit code is evenly dispersed over the three sequences such that 11-bits are coded in "sequence A", 11-bits are coded in "sequence B", and 11-bits are coded in "sequence C". In another example, the codes are not evenly dispersed over the transmission sequence. In still another example, the same code is used for each of the patterns. Each symbol that is transmitted is thus encoded according to the respective coding bits for the corresponding sequence portion. The terms "baud" and "chip" can also be used to refer to symbols.

The correlation of sequence "A" is used to verify that the first portion (e.g., the first 11-bits or bits 0-10) of the unique identifier is coded in the transmission. When a correlation is detected, fine baud and carrier timing can be derived. However, the MT has no prior timing information (e.g., no gross frame timing is known). Since the "A" pattern is repeated over the first-time interval, it is possible to accumulate the signals by adding them on top of one another before correlation is performed such that signal sensitivity is improved. In one example MT, the accumulation of signals is unnecessary. In another example MT, the accumulation of signals is performed during a repetitive tracking mode.

Once the "A" pattern has been acquired, the MT continues sampling to locate the "B" sequence. The correlation of sequence "B" is used to verify that the second portion (e.g., e.g., the second 11-bits or bits 11-21) of the unique identifier is coded in the transmission. As previously described, the "B" sequence is shifted over time. For example, a first B sequence includes coded bauds B0, B1, . . . , BM, while the second B sequence (B') includes coded bauds B1, B2, . . . ,BM, B0. When correlation is achieved with the MT's "B" sequence, the MT identifies a stream position within the "B" sequence. Once the transmission stream position is determined from the shift pattern, the MT schedules the reception of sequence "C", whose arrival can now be predicted.

For the above described "B" sequencing example, a single baud shift is used between subsequent transmissions. Other shifting methods can be used such that the step size for shifting between subsequent transmissions can be a different integer number of baud shifts (e.g., 2, 3, 4, etc.) or a non-integer number of baud shifts (e.g., ½ baud, ¾ baud, 1½ baud, 2¼ baud, etc.) or a shift in samples of either an integer or non-integer variety. In another example, the shifting mechanisms between subsequent transmission can be replaced by a carrier phase rotation, where each subsequent transmission has the carrier phase rotated by a fixed amount.

Frame "C" has a third portion of the unique identifier encoded therein, and possible command and control data for the MT (or other data for the RL). The correlation of sequence "C" is used to verify the third portion (e.g., the third 11-bits or bits 22-33) of the unique identifier is coded in the transmission. The "C" sequence can also be very slowly modulated with a few bits of data. For example, up to 63 bits of data and error correction code (ECC) can be transferred in sequence "C". In one example, the chips or transmit symbols are encoded by inverting or not-inverting patterns of "C" in the transmission frame. Examples of coded command and control information were previously described above.

For the above described "C" sequence, data is encoded using an inverting and non-inverting encoding method. Other data encoding methods can be used such as encoding the data with a shifting bit pattern similar to the "B" sequence. For example, a "000" binary code can be encoded, and each increment in the binary code is the same pattern shifted by an incremental shift step (e.g., ½ baud step, 1 baud step, 2 baud step, etc.). The data message nominally in "C" can be encoded with a pattern timing changes as in the nominal section "B" previously described.

In an unsecure communication mode the MT transmits sequences A and Bin substantially the same format as that described above. However, since the RL initiated the transmission and does not have a "wake-up" period creating an ambiguity in when reception begins, the transmission sequence from the MT can be shorter overall. The shortened transmission period helps minimize the MT's energy consumption. Frame "C" is similarly formatted, but may include other reported data such as: current temperature, heart rate, blood pressure, etc. In a secure communication mode, the MT does not transmit the sequences A, B, and/or C, and instead transmits the noise pattern at the predetermined time delay after receipt of the interrogation signal, as will be described in connection with FIGS. 3B and 3C.

The timing and carrier signals for transmission in the MT are derived from the RL's clock as measured against the internal MT clock. The RL in turn correlates these signals, similar to the MT, and determines the exact round-trip time. The RL also determines deviations in the signal timing with respect to its own clock, which the MT attempted to mimic. The deviation in the signal timing is a consequence of Doppler shift, noise, and oscillator instability.

An example system has the following general information for a transmission:
Received Frame consists of 4096 samples, 2047 baud;
Received Sample Rate is 25.777M complex samples/sec;
Transmitted Sample Rate is 2*25.777M complex samples/sec;
Baud Rate is determined by Sample Rate*(2047/2048)/2=12.8822 Mbaud symbols/sec, QPSK; and
Frame Period is 158.98 μs.

An example system has the following RL TX parameters for a transmission:
"A" sequence is 2.2263 seconds long, (13×1024 frames), repeated un-shifted with one of 2047 first address portions;
"B" sequence is 317.96 ms long (2000 frames), repeated shifted with one of 2047 second address portions; and
"C" sequence is 10.174 ms long (64 frames), repeated un-shifted with one of 2047 third address portions, frames inverted according to modulated data.

An example unsecure system has the following MT TX parameters for a transmission:
"A" sequence is 81.397 ms long, (512 frames);
"B" sequence is 20.349 ms long (128 frames); and
"C" sequence is 10.174 ms long (64 frames), repeated un-shifted with one of 2047 third address portions, frames inverted according to modulated data.

Figure 3B:
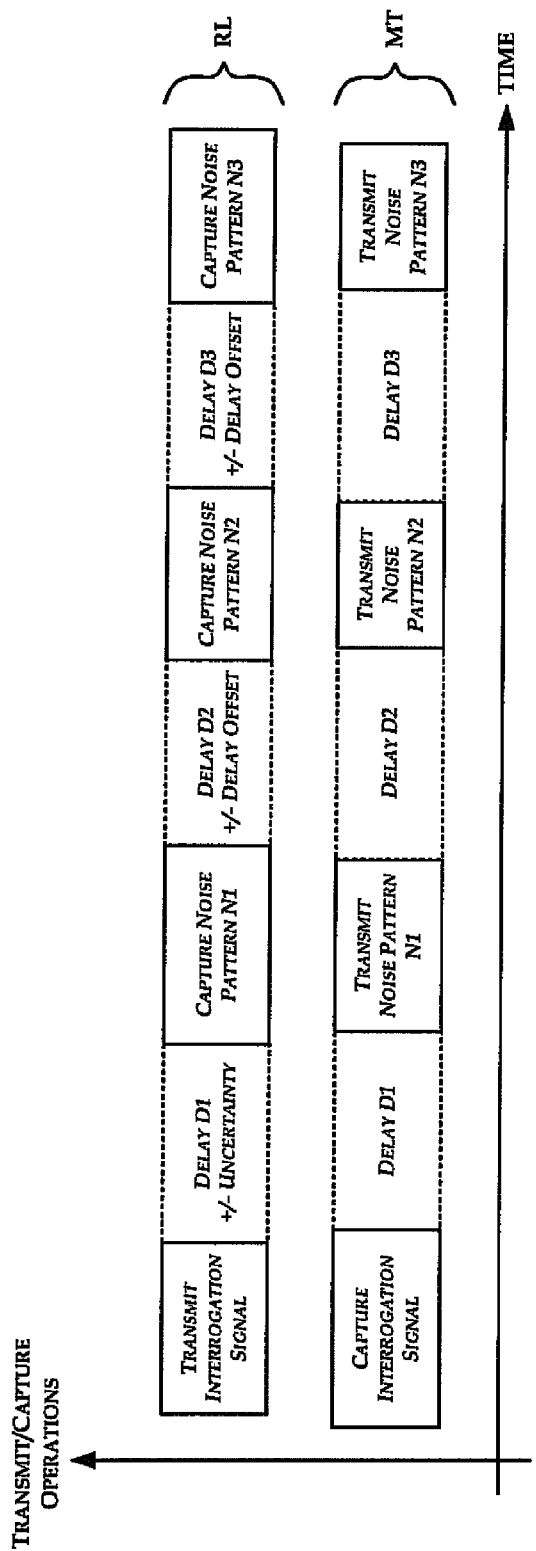
FIGS. 3B and 3C illustrate example operations that may be performed following the transmission of the example interrogation signal.
Figure 3C:
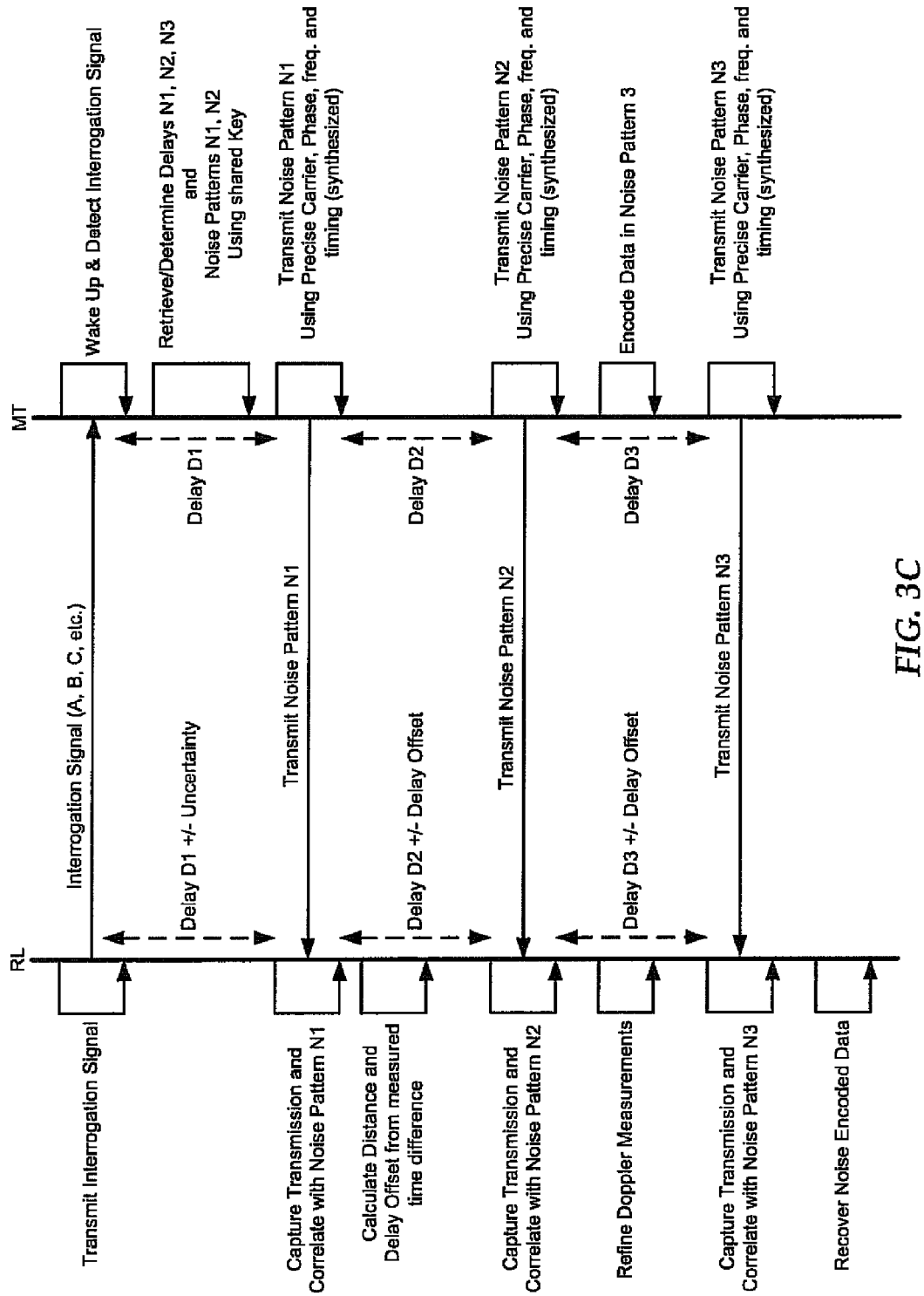

FIGS. 3B and 3C illustrate example operations that may be performed following the transmission of the example interrogation signal that is adapted in accordance with at least some exampled described herein.

As shown in FIG. 3B, the RL may be configured to perform the following operations when the security mode is enabled: "Transmit Interrogation Signal", Capture Noise Pattern N1", "Capture Noise Pattern N2", and "Capture Noise Pattern N3". Similarly, the MT may be configured to perform the following operations when the security mode is enabled: "Capture Interrogation Signal", "Transmit Noise Pattern N1", "Transmit Noise Pattern N2", and "Transmit Noise Pattern N3." As illustrated, the capture interval for the MT can be slightly larger than the transmit intervals for the RL so that the receivers in the MT are ensured to capture enough samples to identify the interrogation signal. Similarly, the capture intervals for the RL can be slightly larger than the transmit intervals for the MT so that the receivers in the RL are ensured to capture enough samples to identify the noise patterns. The noise patterns (Patterns N1-N3) are mutually known by the RL and the MT, as are the various delay times (Delays D1-D3) between the transitions. Also illustrated, the capture time for Noise Pattern N1 has an uncertainty error from Delay D1 that is due to the unknown distance between the RL and MT. After Noise Pattern N1 is captured, the RL can calculate the distance and determine a delay offset for the remaining capture intervals.

As shown in FIG. 3C, the RL initiates communication by transmitting an interrogation signal, which may be formatted as described previously with respect to FIG. 3A. If the MT is active in a Wake-Up Cycle, the MT can capture samples from the receiver and detect the interrogation signal. The MT either determines or retrieves the predetermined delays D1-D3 and the Noise Patterns N1-N3 using a secret shared key. After Delay D1, the MT transmits a first reply sequence as Noise Pattern N1, using the precisely determined carrier, phase, frequency, timing and cadence that is determined from the interrogation signal. The RL waits for the expiration of Delay D1 (+/− the uncertainty) relative to the transmission of the interrogation signal to begin the capture interval to evaluate samples that are expected to correlate with Noise Pattern N1. If a correlation is detected by the RL, then the RL can determined a distance from the RL to the MT, the RL can calculate the delay offset for the remaining capture intervals, and the RL can determine a coarse Doppler measurement. After Delay D2, the MT transmits a second reply sequence as Noise Pattern N2, using the precisely determined carrier, phase, frequency, timing and cadence that was determined from the interrogation signal. The RL waits for the expiration of an offset version of Delay D2 relative to the transmission of the interrogation signal to begin the capture interval to evaluate samples that are expected to correlate with Noise Pattern N2. From the capture of Noise Pattern N2, the RL can refine the Doppler measurement. After Delay D3, the MT transmits a third reply sequence as Noise Pattern N3, using the precisely determined carrier, phase, frequency, timing and cadence that was determined from the interrogation signal. The RL waits for the expiration of an offset version of Delay D3 to begin the capture interval to evaluate samples that are expected to correlate with Noise Pattern N3. From the capture of Noise Pattern N3, the RL can further refine the Doppler measurement to determine the exact distance and direction of the MT from the RL. Noise Pattern N3 can be further encoded by the MT with data that can be decoded by the RL upon reception.

The interrogation signal that is transmitted by the RL to the MT can consist of the three part sequence described previously above. However, since the interrogation signal is a repeating pattern, an intercepting device could capture the interrogation signal and initiate spoofing attacks. A spoofing attack is a situation where a device masquerades as another by falsely sending messages or data to gain an otherwise illegitimate advantage such as access to network communications that would be otherwise blocked. In order to deter interception and spoofing, the RL and MT can both be adapted to periodically change the interrogation signal. For example, one or more of the coded sequences that comprises the interrogation signal (e.g., one or more of the Sequences such as Sequence A, B or C described previously) could be changed according to a regular schedule that is mutually secretly known by the RL and the MT. In a simple example, the schedule for changing the interrogation signal can be based on a time of day and/or calendar date. In some additional examples, security keys and/or secure hashing functions can be utilized to determine the selection of the interrogation signal that is used by the RL and the MT. Similar to the noise sample patterns and delay times described previously with respect to FIG. 1D, the interrogation signal parameters can be programmed into the RL and MT at the time of manufacturing. Example interrogation signal parameters can include the codes encoded in the A, B and C sequences, a schedule for adjusting one or more of the codes, a lockout time before another interrogation signal can be processed, and any other appropriate parameter.

EXAMPLE DATA ENCODING SCHEMES FOR NOISE PATTERNS

As described previously, data can be encoded in a transmission from the MT to the RL. The data can be encoded using one or more modulation techniques, including but not limited to transmission time modulation, transmission phase angle modulation, a transmission frequency modulation, and/or sample rotation modulation of the Noise Pattern N3.

In transmission time modulation, the MT can be configured to encode data in the transmission of Noise Pattern N3 by modulating (i.e., adjusting or varying) a time offset to the transmission time (e.g., by a sample sequence rotator) of the signal transmission relative to an expected transmission time. Instead of transmitting the reply transmission (i.e. the third reply sequence) after Delay D3, the expected transmission time, the reply transmission can be transmitted by the MT after an offset amount relative to Delay D3. The amount of offset relative to Delay D3 can correspond to the transmitted data. The RL can be configured to capture samples of the reply transmission about the expected correlation time, determine an actual correlation time (e.g., a time-stamp) for when a correlation is determined from the captured samples, calculate a time delay offset as a difference between the actual correlation time and the expected correlation time (i.e., Delay D3), and decode the data from the time delay offset. In one example, an 8-bit data word can be encoded as 256 different amounts of 1 μs delay time steps relative to Delay D3, and Noise Pattern N3 includes 100,000 samples that are transmitted over a 5 ms transmission time. When the MT is to transmit an eight bit data word of 00000111, the MT can adjust the transmission time of Noise Pattern N3 from Delay D3 to (Delay D3+7 μs). When the RL captures the samples of Noise Pattern N3, the RL determines that the time stamp associated with the correlation of Noise Pattern N3 is (Delay D3+7 uS), and thus the 7 uS offset can be determined and decoded as a binary value of 00000111. In other examples, Delay D3 may be offset in a negative direction so that the time of transmission corresponds to Delay D3−7 uS, for example.

In transmission phase angle modulation, the MT can be configured to encode data in the transmission of Noise Pattern N3 by statically adjusting the rotational phase angle (e.g., by a phase angle modulator) of the transmission by a fixed amount relative to an expected transmission phase angle. Instead of transmitting the reply transmission (i.e. the third reply sequence) after Delay D3 at an expected phase angle, the reply transmission can be transmitted by the MT after an offset phase angle that is offset by either 0 degrees, 90 degrees, 180 degrees, or 270 degrees (−90 degrees). Since one of four static phase angles are available, the phase angle modulation can correspond to two (2) data bits. The RL can be configured to capture samples of the reply transmission, determine an actual phase angle for when a correlation is determined from the captured samples, calculate a phase angle offset as a difference between the actual phase angle and an expected phase angle, and decode the data from the difference in the phase angle.

In transmission frequency modulation, the MT can be configured to encode data in the transmission of Noise Pattern N3 by statically adjusting the carrier frequency (e.g., by a frequency modulator) of the transmission by a fixed amount relative to an expected transmission frequency. Instead of transmitting the reply transmission (i.e. the third reply sequence) after Delay D3 at an expected frequency, the reply transmission can be transmitted by the MT with a frequency offset. The RL can be configured to capture samples of the reply transmission, determine an actual frequency for when a correlation is determined from the captured samples, calculate a frequency offset as a difference between the actual frequency and an expected frequency, and decode the data from the difference in the frequency.

In sample rotation modulation, the MT can be configured to encode data in the transmission of Noise Pattern N3 by rotating (e.g., by a sample sequence rotator) the order of transmission of the samples from Noise Pattern N3. The RL can be configured to capture samples of the reply transmission, determine a rotational position for Noise Pattern N3 when a correlation is determined from the captured samples, and decode the data from the rotational position of Noise Pattern N3. For example, Noise Pattern N3 may consist of $2^{16}$ or 65,536 samples ordered sample 1 through sample 65,536; where the samples can be rotated in one of 65,536 rotational positions. In one example, a data word with a value of 0000000000000001 can be encoded by transmitting the samples from Noise Pattern N3 beginning at sample 2 through 65,536 followed by sample 1. In this example, the RL can be configured to determine the rotational position of Noise Pattern N3 as rotational position 1, which decodes to a data word of 0000000000000001.

EXAMPLE TIMING ACQUISITION SEQUENCE

Figure 4A:
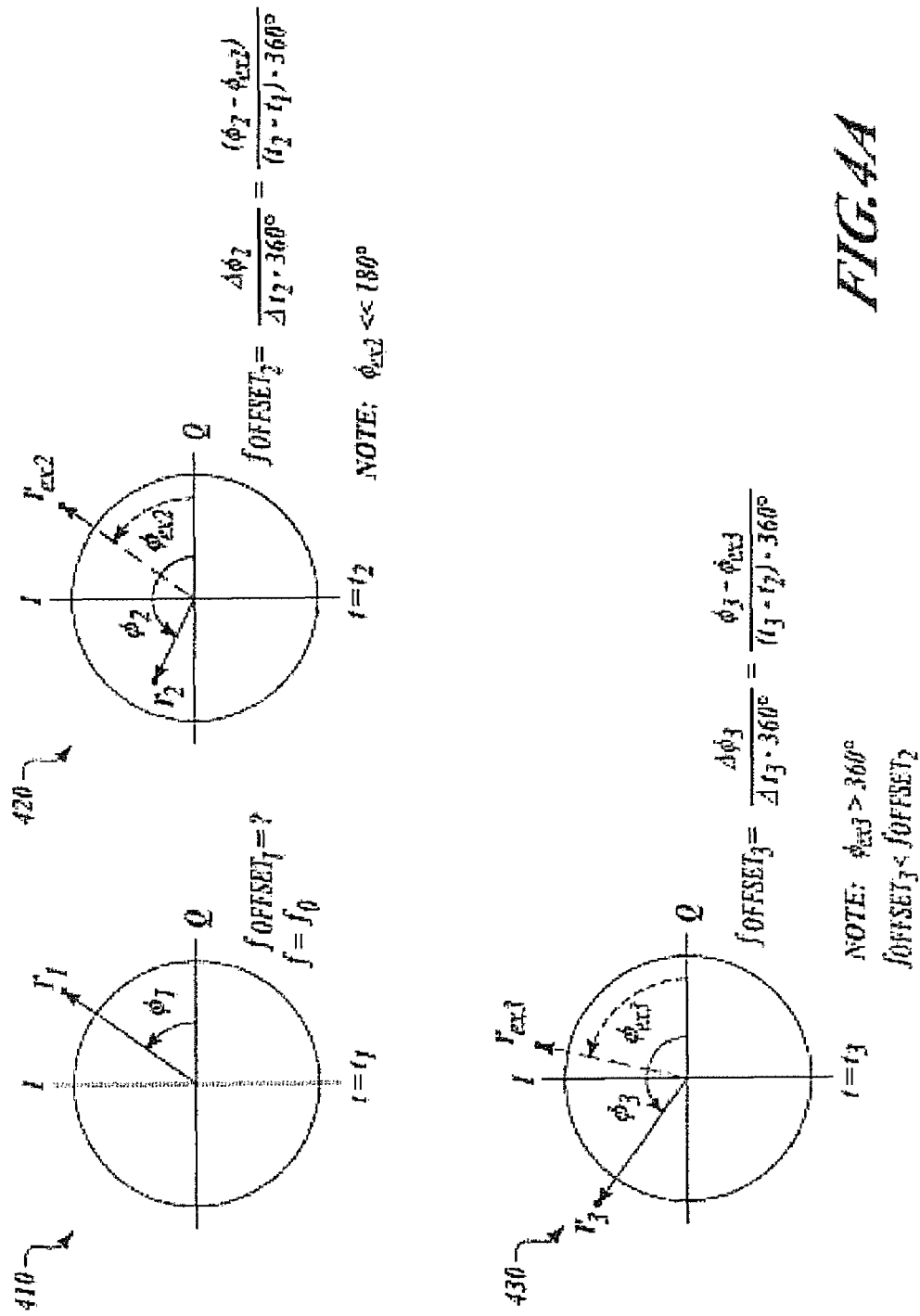
FIGS. 4A and 4B are diagrams illustrating the timing acquisition for an example secure communication system.
Figure 4B:
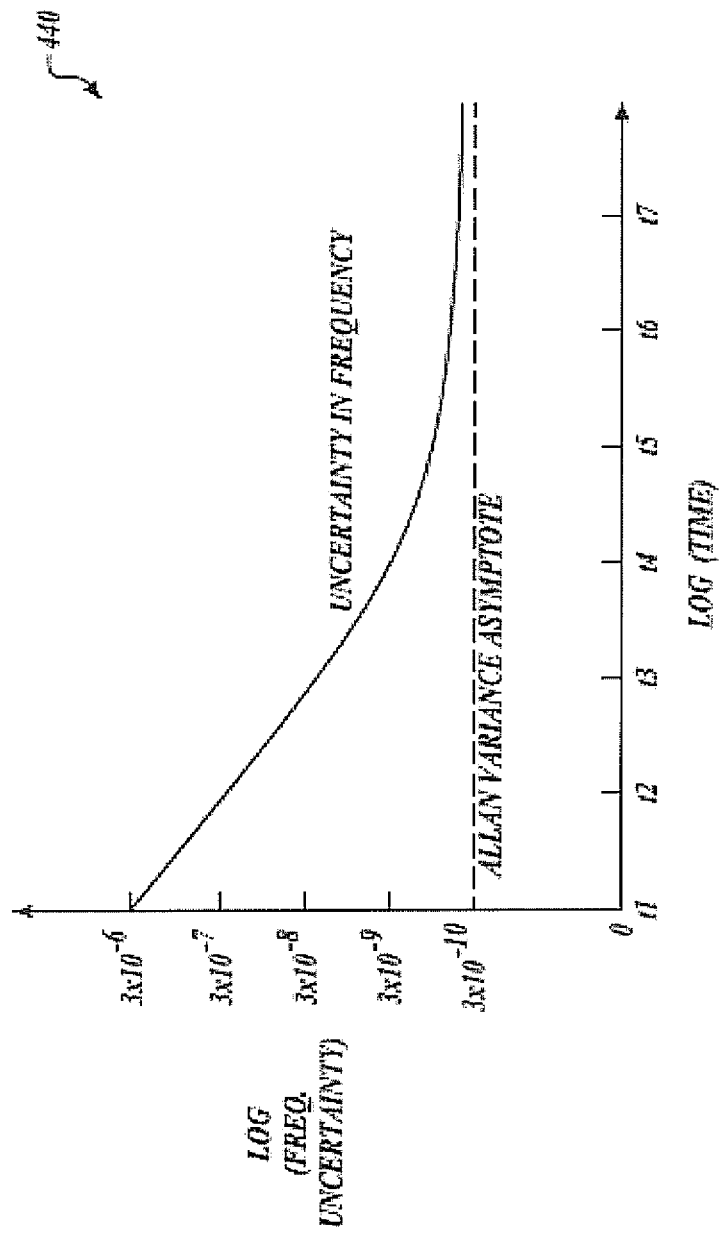

FIGS. 4A and 4B are diagrams illustrating the timing acquisition for an example communication system. The described timing acquisition sequence may be employed by the MT when receiving the three-part transmission sequence described previously with respect to FIGS. 1A, 113, 2 and 3. However, as described herein, the timing acquisition sequence can be accomplished with only two of the three portions of the transmission sequence (e.g., sequence A and sequence B).

The receiver frequency is digitally synthesized from a locally generated clock circuit (e.g., a crystal oscillator). The carrier wave from the RL is also digitally synthesized from its own locally generated clocking circuits, and will likely be mismatched from the receiver frequency in the MT. The mismatch may be related to thermal differences in the operating environment, heat transients in the circuits, crystal tolerances, processing differences between the MT and the RL, as well as other non-ideal effects. Moreover, the overall system is not synchronized so there is no way to initially know the starting phase, frequency and cadence associated with the transmissions. FIG. 4A illustrates examples of phase and frequency determinations associated with an example "pattern A" sequence, while FIG. 4B illustrates the uncertainty in the receiver frequency over time during the timing acquisition.

The receiver portion of the communication system is initialized at time $t_1$ to an initial frequency (f) that is designated as $f=f_0$. However, the offset between the digitally synthesized receiver frequency and the carrier frequency from the received transmission is unknown at time $t=t_1$. The MT is arranged to measure the phase associated with the received signals from pattern A as phase $\phi_1$. The phase measurement (e.g., $\phi_1$) can be generated by an output of the correlator.

At time $t=t_2$, another portion of the transmission of pattern A is received, and the MT is arranged to measure the phase as $\phi_2$, and calculate a frequency offset error associated with the difference between the expected receiver frequency and the actual carrier wave from the RL's transmission. The frequency offset ($f_{offset2}$) is determined by the difference in the phases and the elapsed time between transmissions as: $f_{offset2}=[\phi_2-\phi_{ex2}]/[360(t_2-t_1)]$, where $\phi_{ex2}$ corresponds to the expected phase at time $t_2$. It is important to note that the time between the first two measurements should be short enough to result in an expected relative phase difference of substantially less than 180 degrees to ensure that unresolvable ambiguities do not occur. The expected phase is based on a reception interval for an integer period of frames that is reasonable based on expected transmission/reception time intervals. Notice that the expected phase for this time corresponds to $\phi_1$ At time $t=t_3$, another portion of the transmission of pattern A is received, and the MT is arranged to measure the phase as $\phi_3$, and calculate a frequency offset error associated with the difference between the expected receiver frequency and the actual carrier wave from the RL's transmission. The frequency offset ($f_{offset3}$) is determined by the difference in the phases and the elapsed time between transmissions as: $f_{offset2}=[\phi_3-\phi_{ex3}]/[360(t_3-t_2)]$, where $\phi_{ex3}$ corresponds to the expected phase at time $t_3$. The expected phase is again based on a reception interval for an integer period of frames that is reasonable based on expected transmission/reception time intervals. It is important to note that the elapsed time for the first two measurements should again result in an expected relative phase difference of substantially less than 180 degrees to ensure that unresolveable ambiguities do not occur. However, the absolute phase difference is expected to be significantly larger than 360 degrees such that the time difference between successive offset calculations can be gradually spaced further and further apart as the timing acquisition is adjusted by each subsequent estimate. Notice that the frequency error is gradually reduced with each subsequent adjustment until limited by the Allan Variance.

FIG. 4B is a graph illustrating the uncertainty in the digitally synthesized receiver frequency over an elapsed timing acquisition period. Note that the scale for both axes is logarithmic, and that the uncertainty will asymptotically approach the Allan Variance associated with the crystal oscillators in the MT and the RL. The horizontal axis illustrates elapsed time, while the vertical axis illustrates the uncertainty in the frequency. Each successive time period has a refined estimate of the receiver timing such that the uncertainty decreases in an exponential fashion. A knee in the uncertainty curve occurs after sufficient samples of the received signal are acquired (e.g., at time $t_5$) such that estimates for the received carrier wave frequency asymptotically approach a minimum uncertainty that is determined by the Allan variance.

EXAMPLE RECEIVER

Figure 5A:
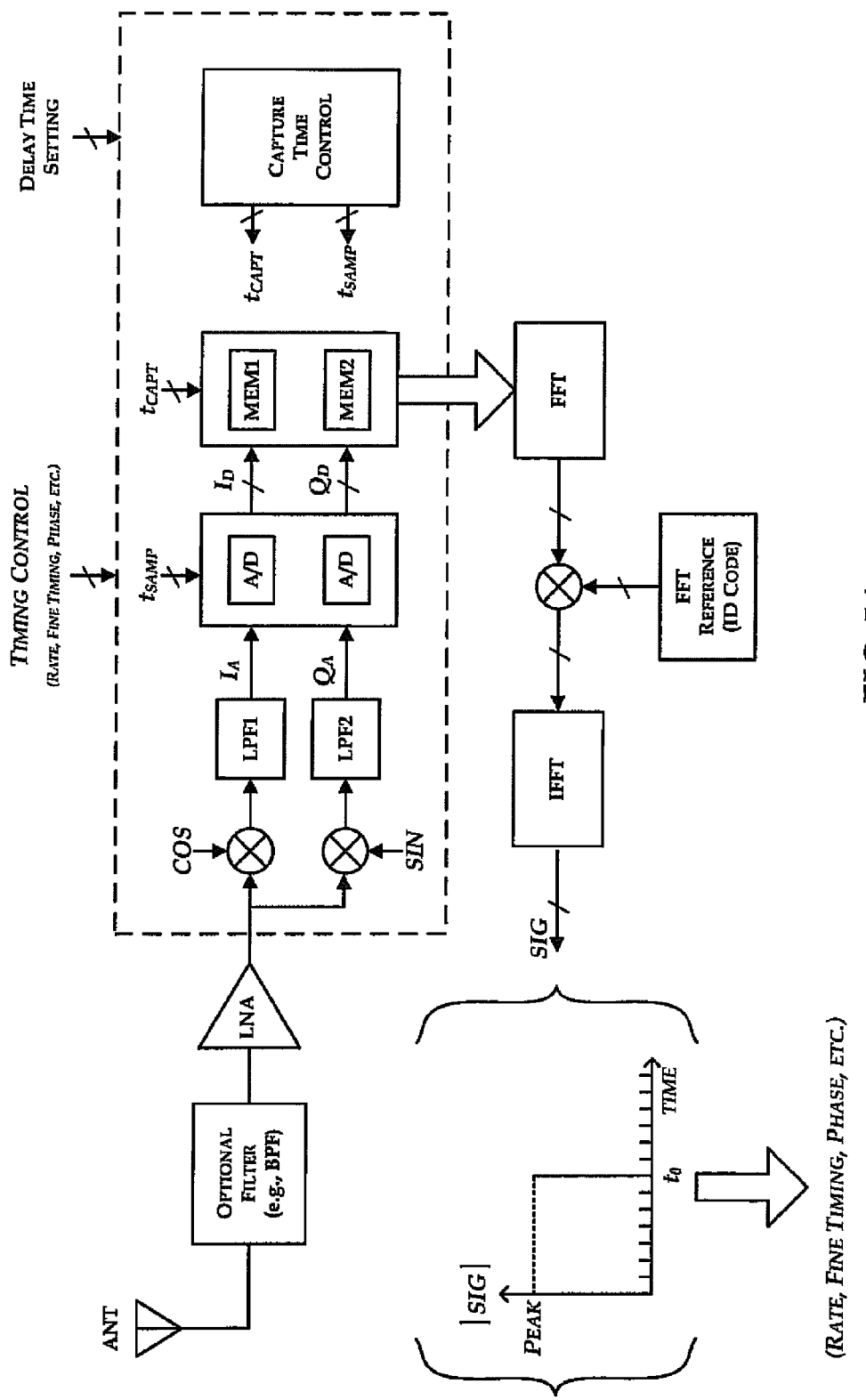
FIGS. 5A-5B illustrate various portions of an example receiver.

FIG. 5A is a block diagram for an example receiver. The example receiver includes an antenna (ANT), an optional filter, a low noise amplifier (LNA), a first mixer, a second mixer, a first low pass filter (LPF1), a second low pass filter (LPF2), an analog-to-digital converter (ADC), a buffer, an FFT processor, a correlator, and an inverse FFT processor. Other example receivers can use an analog storage method with delayed use of the ADC.

The antenna is arranged to couple received signals to the LNA through the optional filter (e.g., a band-pass filter). The LNA is arranged to increase signal strength, and couple the increased signal to the mixers. The first mixer is arranged to generate an in-phase signal (I) with a cosine wave heterodyne, while the second mixer is arranged to generate quadrature signal (Q) with a sine wave heterodyne. The in-phase signal is coupled to the ADC via LPF1 as signal $I_A$, while the quadrature-phase signal is coupled to the ADC via LPF2 as signal $Q_A$.

The ADC is operated at a sampling frequency ($f_{SAM}$). The ADC can be implemented as a single A/D converter circuit with time division multiplexing between the $I_A$ and $Q_A$ signals. The ADC can alternatively be implemented as two separate A/D converter circuits. The ADC circuits convert the $I_A$ and $Q_A$ signals to quantized digital signals that are coupled to the buffer as signals $I_D$ and $Q_D$, respectively. The buffer can be implemented as one contiguous memory, as partitioned memory (e.g., MEM1, MEM2, etc.), or any other appropriate temporary storage that buffers the captured data.

The output of the buffer is coupled to the FFT processor, which converts the input signal to the frequency domain. The FFT of the reference signal is complex conjugate multiplied with the frequency domain representation of the captured signal. An inverse FFT of the product is taken, which is the circular correlation of the captured signal and the selected reference signal. Since the FFT reference is determined from the unique identifier of a MT (e.g., ID Code), the correlation of the FFT processor output (e.g., SIG) will peak at a particular time (e.g., $t_0$) when a valid received code is identified in the signal. The carrier phase and pattern timing are also extracted from the timing of the received signals when a correlation peak is detected.

Figure 5B:
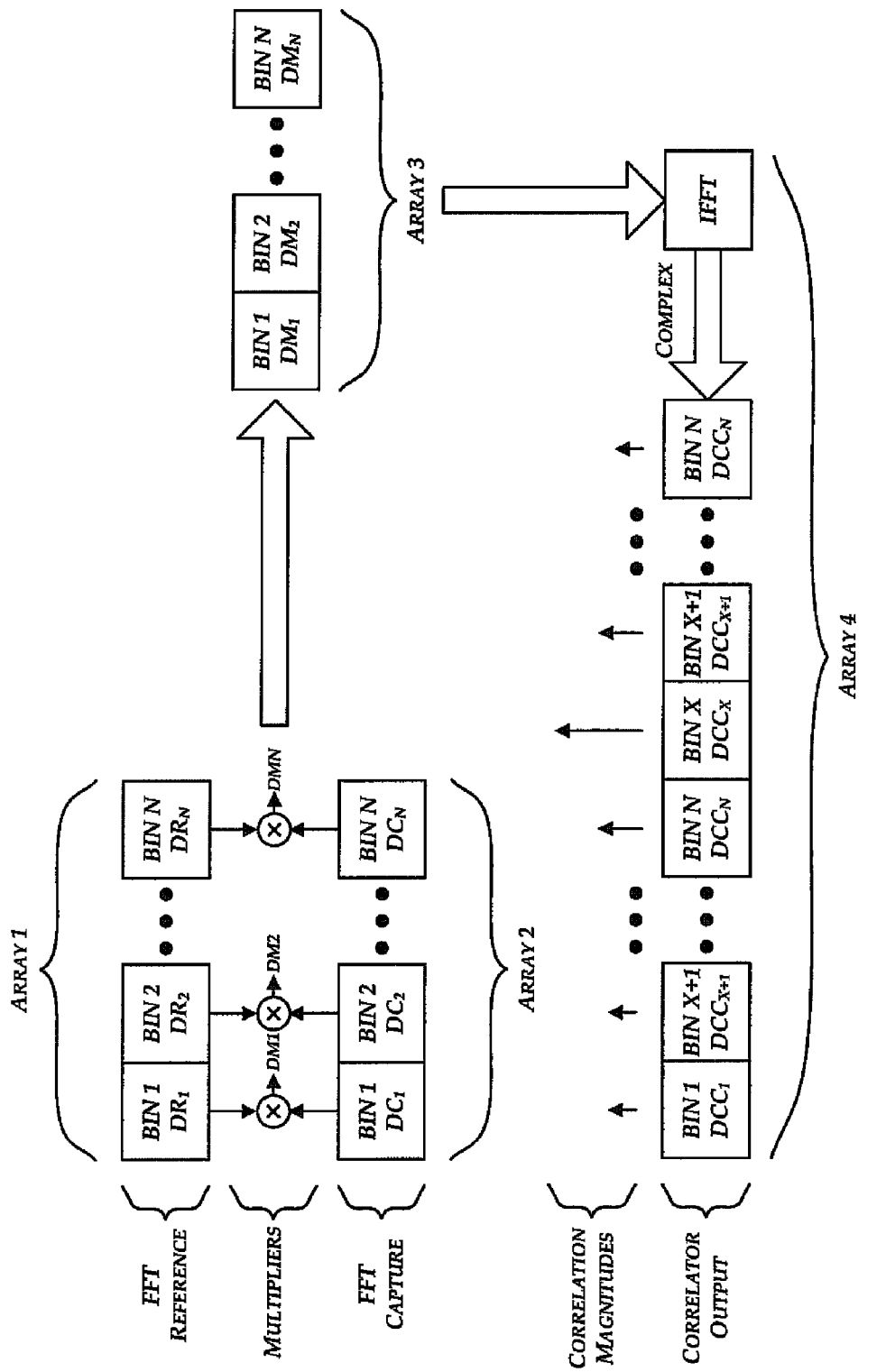

FIG. 5B illustrates operations in a receiver that may be performed as a DSP block. The FFT reference signal is provided as an array of N-bins. The captured signal is calculated as an FFT, also of N bins. Next, the complex conjugate of each complex element in a designated storage bin (BIN 1-BIN N) is multiplied by the data from the other corresponding storage bin. For example, the complex conjugate of the FFT reference signal is stored in a first array (ARRAY 1) as $D_{R1}$-$D_{RN}$, and the FFT capture data is stored in a second array (ARRAY 2) as $D_{C1}$-$D_{CN}$. In another example, the FFT reference signal is stored in the first array (ARRAY 1) as $D_{R1}$-$D_{RN}$, and the complex conjugate of the FFT capture data is stored in the second array (ARRAY 2) as $D_{C1}$-$D_{CN}$.

The multipliers are arranged to receive data from the first array and the second array to provide a multiplied output, yielding a product result that can be stored in a third array (ARRAY 3) as $D_{M1}$-$D_{MN}$. An inverse FFT is computed from the product identified in the third array (ARRAY 3), to retrieve the circular correlator output. The circular correlator output results can be stored in a fourth array (ARRAY 4), or can optionally overwrite the values from the third array (ARRAY 3). The contents of the fourth array (ARRAY 4), or the third array depending on the implementation, are a complex result that includes both magnitudes and phases. As illustrated in FIG. 5B, the inverse FFT of the circular correlator output has a peak magnitude (PEAK) that occurs when the FFT reference and the captured data correlate with one another. Each bin (BIN1-BIN N) of the third array (ARRAY 3), or fourth array depending on the implementation, corresponds to the output of the correlator, wherein a PEAK may be located in one of the bins (e.g., BINX), when a correlation occurs.

EXAMPLE OPERATIONAL FLOW FOR INTERROGATION SIGNAL TRANSMISSION

Figure 6:
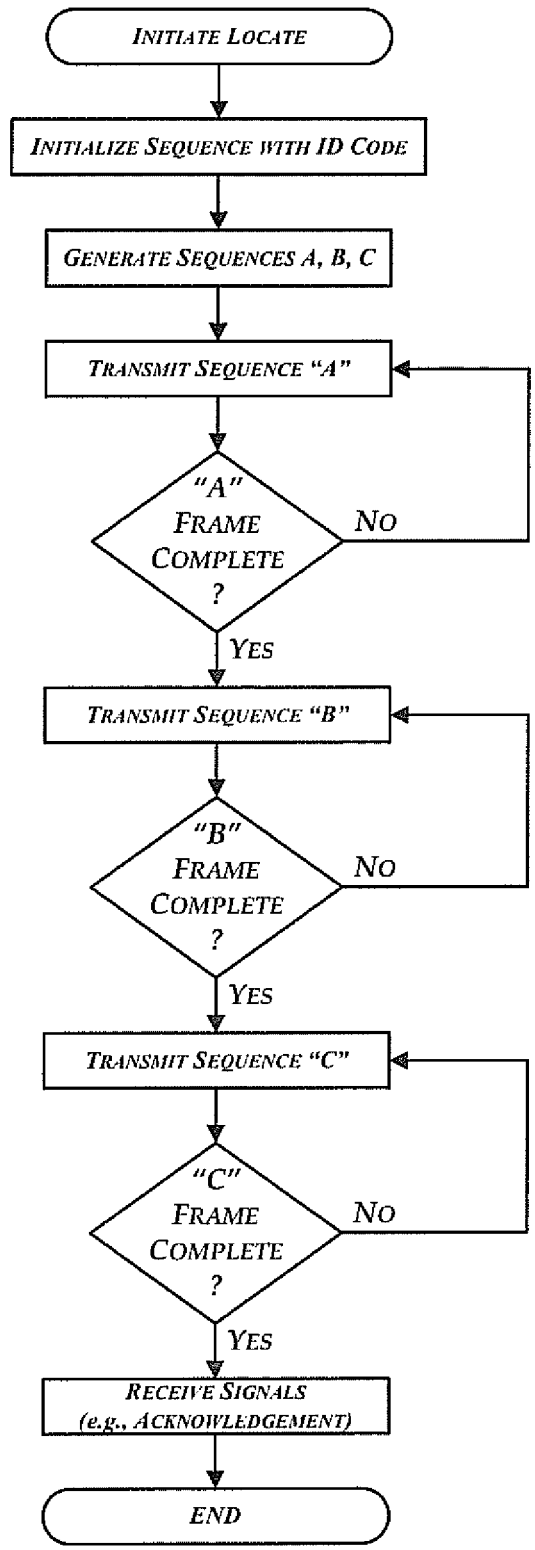
FIG. 6 is a flow-chart for an example transmitter.

FIG. 6 is a flow chart for an example transmission of an interrogation signal, which may be implemented in an RL. In an unsecure communication mode, the MT may also be adapted to implement transmission of the A, B and C sequences illustrated by the flow chart of FIG. 6. Processing begins when a user, or some other process, initiates a request to locate a particular MT.

A transmission sequence for an interrogation signal is initialized with a unique identifier (ID Code). Sequences are generated for frame transmission such as sequence "A", "B", and "C" as previously described. Each of the "A", "B", and "C" sequences consists of bauds that are encoded with a portion of the unique code.

Next, the RL (or MT) then begins transmitting pattern "A", and repeats transmitting pattern "A" (Note: un-shifted) until the entire "A" sequence is completed (e.g., 13×1024 sequential patterns, or frame "A"), or the equivalent time has expired for transmitting the pattern "A" frame in the case of hollowed frames. The RL then begins transmitting pattern "B". For each subsequent transmission of pattern "B", the pattern is shifted such as using a bit rotation algorithm, as previously described. After the entire sequence of "B" patterns is transmitted (e.g., 2000 sequential patterns, or frame "B"), or the equivalent time has expired for transmitting the pattern "B" frame in the case of hollowed frames, the RL begins transmitting the "C" pattern. The sequence of "C" patterns includes modulated data that may correspond to command and control information for the MT. After the modulated data is transmitted (e.g., 64 sequential pattern, or frame "C"), or the equivalent time has expired for transmitting the pattern "A" frame in the case of hollowed frames, the RL stops transmitting and switches into a receive mode.

In the receive mode for unsecure communications, signals can be received from the MT with the RL in a similar format as provided between the RL and the MT. In the receive mode for secure communications, the MT transmits the noise patterns at the previously determined time delays as is illustrated by FIGS. 3B and 3C. Upon receipt of the communications from the MT to the RL, the RL can then calculate a distance and location based on the round-trip time and Doppler shift in the received signals as previously described. Moreover, data that is communicated between the MT and the RL can be extracted and evaluated by the RL. Such data may include: any variety of information including but not limited to physiological information such as heart rate, body temperature, blood pressure, heart rhythm, blood-sugar level, as well as other sensory information that is associated with a user of the MT.

Figure 7:
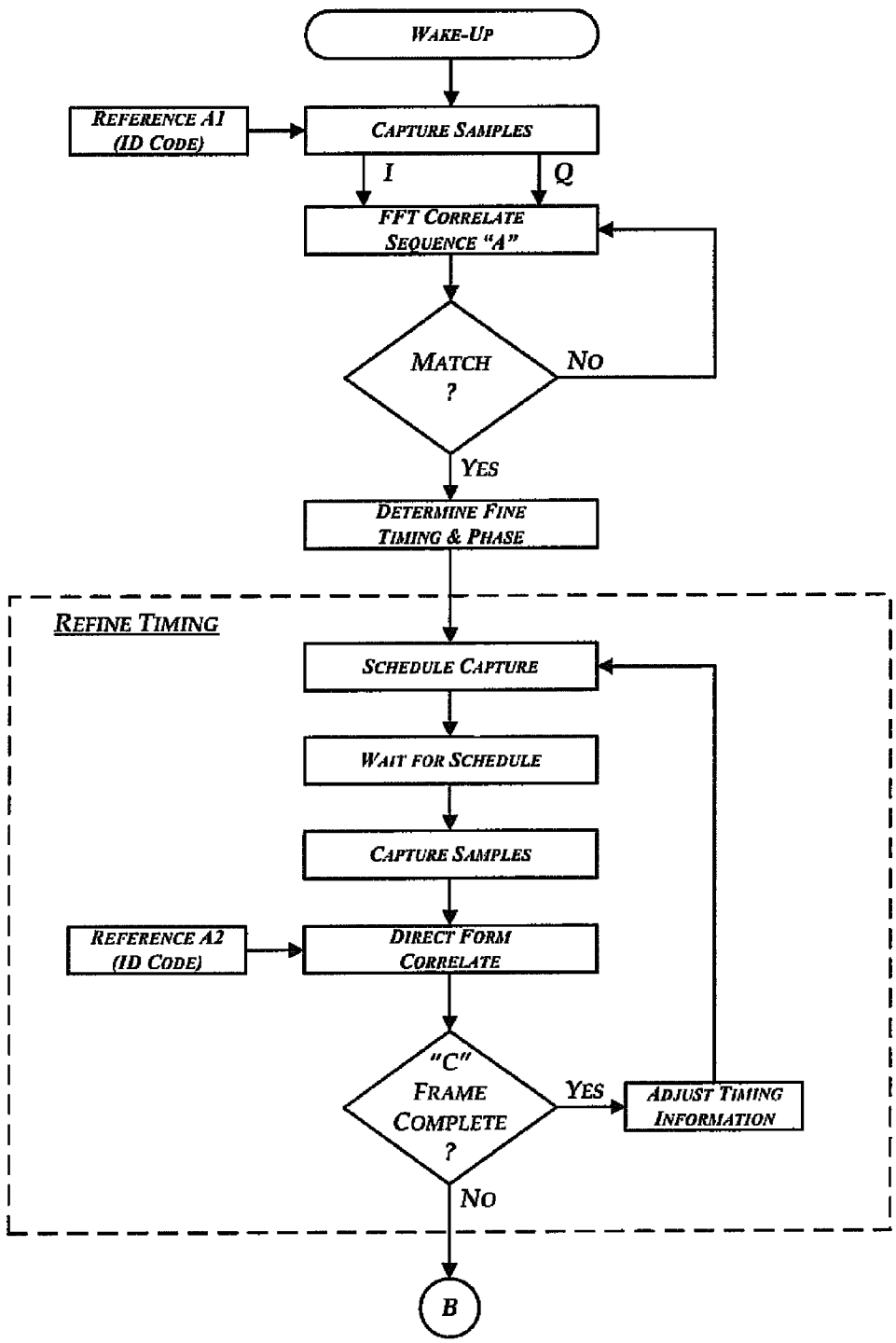
FIGS. 7, 8, and 9 are flow-charts for receivers, all arranged in accordance with at least some aspects of present disclosure.

FIG. 7 is an example flow chart for an example receiver in a MT configured to capture a signal when searching for an interrogation signal. Processing begins when the MT is activated out of a sleep mode (e.g., WAKE-UP is initiated). FIG. 7A illustrates the capture of samples associated with sequence "A" (or frame "A") from an interrogation signal. After wake-up is initiated, the receiver captures noise and/or signals. The MT will attempt to correlate the captured noise and/or signals with an expected transmission sequence that is encoded with the first portion of the unique identifier for the specific MT. When the correlation fails to match, the MT determines that the transmission is intended for another device, or possibly that no transmission is present, and returns to a sleep mode. Alternatively, the MT extracts baud and carrier timing information from the transmission sequence to refine the receiver timings in accordance with the various techniques described herein.

Timing can be refined by repeatedly scheduling capture intervals. The receiver waits, and then begins capturing a portion of the samples from each scheduled capture time, and attempts to correlate the captured samples with an expected transmission sequence that is encoded with another portion of the reference that is keyed to the code for the MT. Each time the correlation indicates a match, the timing for the receiver is adjusted (bootstrapped) to further refine the time/frequency estimates. Eventually, the correlation of pattern A fails to match the coded reference and processing continues to capture and evaluate pattern B as will be described with respect to FIG. 8.

Figure 8:
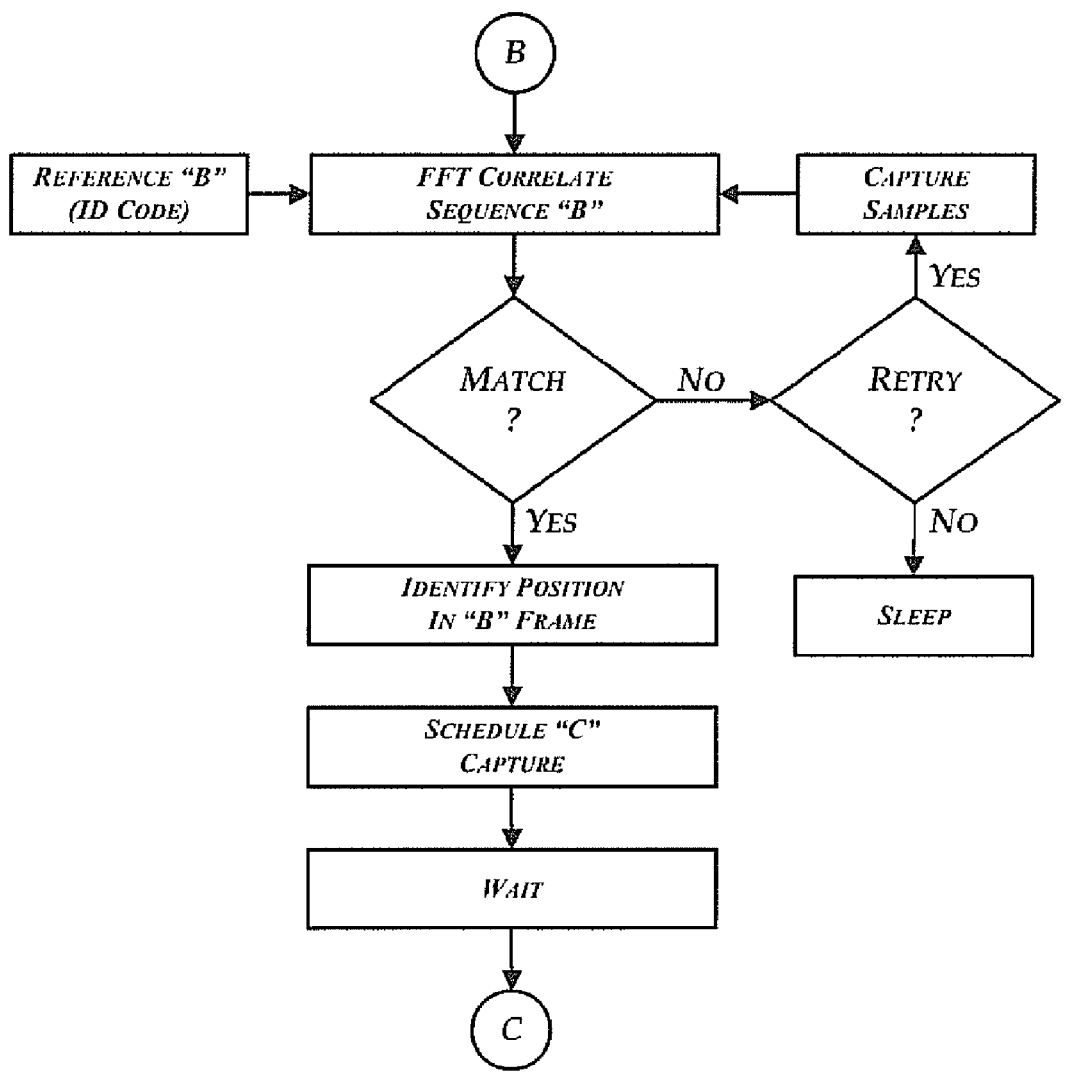

FIG. 8 illustrates the capture of samples associated with pattern "B" of an interrogation signal in a MT device. The receiver captures a sequence of samples, assuming those samples correspond to sequence "B". The MT will attempt to FFT correlate the captured samples with an expected second transmission that is encoded with the second portion of the unique identifier for the specific MT. When the correlation fails to identify a match, the MT may determine that the signal sequence is intended for another device. During a processing time interval, the expected B sequence is shifted and captured, and FFT correlation determinations then follow. When the processing time interval completes without a match of sequence "B", the MT determines that the transmission is intended for another MT or that there is no transmission to receive and returns to a sleep mode. Alternatively, if the MT finds a match for sequence "B", then the MT determines the relative position of the matched pattern within the sequence (or within the frame) based on the shift position that yields a match. Since the timing, phase, and frequency information are now known, the MT schedules reception of the "C" sequence. Processing continues for the MT in FIG. 9, which follows further below.

Figure 9:
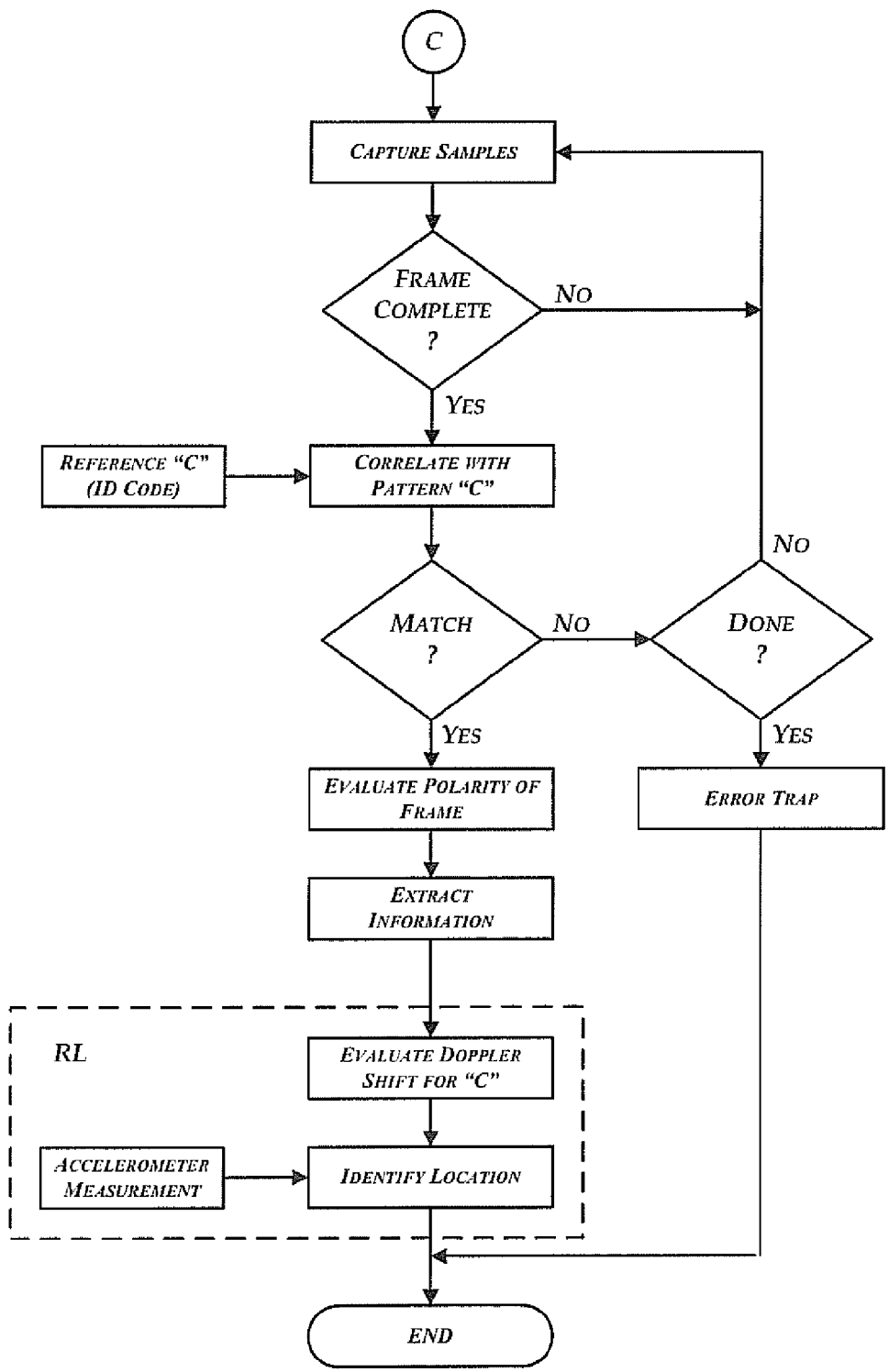

FIG. 9 illustrates the capture of samples associated with sequence "C" of an reply transmission from an MT to an RL in an unsecure communication mode. The receiver of the RL is configured to captures samples of symbols in a signal transmission, assuming those symbols correspond to pattern "C". The MT will continue to capture samples until the frame is expected to reach completion. The MT will then attempt to correlate the captured sequence (assuming it is sequence "C" from the RL) with an expected third transmission that is encoded with the third portion of the unique identifier for the specific MT. When the correlation fails to achieve a sufficient level for detecting a match, we can assume as a formality that the transmission of the "C" sequence has failed for any number of reasons (excessive noise in the environment, a high strength interfering signal, etc.) Since we know precisely when transmission of sequence "C" should occur, and what carrier frequency, phase, timing, and cadence for which transmission should occur, the receipt of the "C" pattern can be used formalistically for verification of a valid transmission.

Sequence "C" includes data modulated therein that may be coded with error correcting codes (ECC), where the coded information can be phase modulated and subsequently demodulated and decoded. When the time-period has not expired, capturing of the expected C sequence is resumed, followed by correlation determinations again. When the time-period has expired without a match of sequence "C", the MT determines that the transmission is intended for another and traps an error condition appropriately. Alternatively, the MT finds a match for pattern "C" and evaluates the polarities of the symbols received in this frame, and extracts command and control information from the "C" sequence.

In the case of the MT, in an unsecure communication mode, the completed capture of sequence C is followed by a transmission of sequences "A", "B", and "C2" (or some other order, perhaps, or even a different set of A'B'C'. Sequences "A" and "B" include a similar pattern as previously described for the RL, although shorter in length. Sequence "C2" is still the same number of frames except that data is encoded into the transmission for communication between the MT and the RL.

In the case of the RL, in an unsecure communication mode, the completed capture of sequence C is followed by evaluation of the round-trip time to determine linear distance from the RL to the MT. A time difference is evaluated between the reception of two signals that are received from two different receiving antennas to help identify a vector for direction between the RL and the MT. An analysis of a Doppler shift in the received signals from the MT can also be used to assist in the determination of the directional vector. In addition, sequence "C" is evaluated to extract transferred information from the MT to the RL. Moreover, measurements from the compass sensor and can be utilized to assist in determining location as will be described later.

EXAMPLE OPERATIONAL FEATURES AND OBSERVATIONS

The present disclosure merges "location request" polling with the location process itself. The RL device is arranged to provide a relatively lengthy, powerful, coded signal whose duration spans the polling interval of the MT. The MT very briefly samples the relevant spectrum, and finds a coded spread spectrum signal. In this event, the MT performs multiple signal captures from the lengthy transmission, making successively more accurate estimates of the signals frequency, cadence, and time reference. These estimates are limited in precision by the short-term stability (root Allan variance) of the MT's and RL's time bases (e.g., a quartz crystal oscillator) and by the relative acceleration between the RL and the MT. This Allan variance will typically be better than 1 part per billion, but the acceleration for observation periods of 0.25 seconds may be the order of: 10 meters/sec$^2$ by 0.25 seconds, which would give a 2.5 meter/second Doppler change. This lurch is unusual, and typically, a 0.25 meter/second change or less is observed. A velocity change of 0.25 meter/second round-trip is 0.5 meter/second, which is a Doppler change of $0.5/3*10^8$, or 1.6 parts per billion (ppb). Thus, the estimates of incoming signal frequency/sequence should have a precision of approximately two (2) parts per billion or better. Experimentally, two (2) ppb has been observed.

The MT can use the precise estimate of the received signal timing to synthesize a coded spread spectrum reply with substantially the same timing and carrier frequency. This reply signal is emitted shortly after the end of the incoming signal. Since the timing is accurately captured, the presence of a delay or gap doesn't materially degrade accuracy. For example, if the time-base error is 2 ppb, then a 30 ms delay translates into a time uncertainty of approximately 60 ps, which is about one centimeter of round trip distance.

The coded reply signal from the MT is sufficiently lengthy so that integration over time compensates for its relatively low power. The signal from the MT can be coherently processed by the RL since the return signal is coherent plus or minus the synthetic round-trip Doppler shift with the RL's time base. The thermal noise over the 100 Hz bandwidth is approximately −154 dbm, where reasonable signal reception is expected at a level of around −140 dbm. A maximum path loss of 150 dB is achieved for a +10 dbm transmitter. The corresponding ideal free space range for this transmitter is approximately 1000 km assuming a 915 MHz signal and omnidirectional antennae. This large free space range or loss margin is useful for building penetration, implanted devices, and so forth.

The capture duration in the MT is limited by the relative crystal frequency tolerance between the MT and the RL. With time and temperature, and taking advantage of periodic calibration signals, this tolerance can be managed to a few parts per million. Thus, the product of the signaling frequency and the crystal tolerance gives a frequency offset, which in turn indicates the maximum possible reception time without the use of multiple Doppler bins or repeated correlation attempts. For example at 915 MHz and with a 3.5 ppm frequency error, a capture period of 312 µs would correspond to a first complete signal null.

The RL will in general receive a signal whose cadence and frequency very closely match its internal crystal clock, and thus the RL can use long integration times, which greatly increase the available signal to noise ratio. The described coherent process has a signal power maximum when the signal has rotated through 180 degrees at the end of the capture interval. For a 50 ppb Doppler range, this occurs when the period of the spread signal is designed to be about 10 ms. It is advantageous to use a signal which is itself complex. The round trip Doppler shift between slowly moving objects (e.g., people walking) is on the order of 4-5 ppb. Slowly moving objects provide a significantly longer integration time in cases where the received signal is likely to be very close in frequency to the RL's time base. Even automobile speeds will result in a round-trip Doppler-shift of 200 ppb or less.

The presently described system, apparatus, and methods take advantage of the acquired frequency knowledge to allow for synthesis of a time and phase coherent response to accurately determine location with a low-power MT. Although the preceding description describes various embodiments of the system, the invention is not limited to such embodiments, but rather covers all modifications, alternatives, and equivalents that fall within the spirit and scope of the invention. For example, the positioning of the various components may be varied, the functions of multiple components can be combined, individual components may be separated into different components, or components can be substituted as understood in the art. Since many embodiments of the invention can be made without departing from the spirit and scope of the invention, the invention is not limited except as by the appended claims.

I claim:

1. A method for a transponder (MT) adapted to communicate with a remote locator (RL), the method for the transponder (MT) comprising:
   capturing samples of a signal transmission spectrum with a receiver in the MT;
   detecting an interrogation signal from the RL when the captured samples correspond to an interrogation signal that is encoded with a specific ID Code associated with the MT; and
   when the interrogation signal is detected:
     synthesizing a precise carrier phase, frequency, cadence and timing for subsequent transmission from the received interrogation signal;
     retrieving a first timing delay (Delay D1) and a first non-repeating noise pattern (Noise N1) for a first signal transmission;
     encoding the first signal transmission with the first noise pattern (Noise N1);
     wherein after the expiration of the first timing delay (Delay D1), transmitting the first signal transmission, which is encoded with the first noise pattern (Noise N1), using the precise carrier phase, frequency, cadence and timing; and
   wherein retrieving the first timing delay (Delay D1) and the first noise pattern (Noise N1) comprises the steps of:
     determining an index from a hash function, and
     selecting the first timing delay (Delay D1) and the first noise pattern (Noise N1) using the index.

2. The method of claim 1, wherein retrieving the hash function corresponds to a cryptographic streaming hash function and wherein the crypto hash function makes the noise samples.

3. A method for a transponder (MT) adapted to communicate with a remote locator (RL), the method for the transponder (MT) comprising:
   capturing samples of a signal transmission spectrum with a receiver in the MT;
   detecting an interrogation signal from the RL when the captured samples correspond to an interrogation signal that is encoded with a specific ID Code associated with the MT; and
   when the interrogation signal is detected:
     synthesizing a precise carrier phase, frequency, cadence and timing for subsequent transmission from the received interrogation signal;
     retrieving a first timing delay (Delay D1) and a first non-repeating noise pattern (Noise N1) for a first signal transmission;
     encoding the first signal transmission with the first noise pattern (Noise N1);
   wherein after the expiration of the first timing delay (Delay D1), transmitting the first signal transmission, which is encoded with the first noise pattern (Noise N1), using the precise carrier phase, frequency, cadence and timing; and
   wherein retrieving the first timing delay (Delay D1) and the first noise pattern (Noise N1) comprises the steps of:
     determining a first index from a first hash function,
     determining a second index from a second hash function,
     selecting the first timing delay (Delay D1) using the first index, and
     selecting the first noise pattern (Noise N1) using the second index.

4. A method for a transponder (MT) adapted to communicate with a remote locator (RL), the method for the transponder (MT) comprising:
   capturing samples of a signal transmission spectrum with a receiver in the MT;
   detecting an interrogation signal from the RL when the captured samples correspond to an interrogation signal that is encoded with a specific ID Code associated with the MT; and
   when the interrogation signal is detected:
     synthesizing a precise carrier phase, frequency, cadence and timing for subsequent transmission from the received interrogation signal;
     retrieving a first timing delay (Delay D1) and a first non-repeating noise pattern (Noise N1) for a first signal transmission;
     encoding the first signal transmission with the first noise pattern (Noise N1);
   wherein after the expiration of the first timing delay (Delay D1), transmitting the first signal transmission, which is encoded with the first noise pattern (Noise N1), using the precise carrier phase, frequency, cadence and timing; and
   wherein retrieving the first noise pattern (Noise N1) comprise the steps of:

providing a predetermined seed to a streaming secure cryptographic hash function, generating a stream of bits from the streaming secure cryptographic hash function, and aggregating groups of bits to generate the first noise pattern (Noise N1).

5. The method of claim 4, wherein the predetermined seed is derived from one or more of a shared key, an ID code associated with the MT, a time stamp, or a date stamp.

* * * * *